United States Patent [19]
Ariki et al.

[11] Patent Number: 5,684,548
[45] Date of Patent: Nov. 4, 1997

[54] LIQUID CRYSTAL DISPLAY ELEMENT AND MICRO-LENS ARRANGEMENT AND A DISPLAY USING THE SAME

[75] Inventors: Yoshio Ariki; Takashi Kakuda; Masaharu Deguchi; Takesuke Maruyama; Futoshi Yamasaki, all of Yokohama, Japan

[73] Assignee: Hitachi, Ltd., Tokyo, Japan

[21] Appl. No.: 470,456

[22] Filed: Jun. 6, 1995

Related U.S. Application Data

[63] Continuation of Ser. No. 852,005, Mar. 16, 1992, Pat. No. 5,455,694.

[30] Foreign Application Priority Data

Mar. 14, 1991 [JP] Japan .................. 3-073617
Apr. 10, 1991 [JP] Japan .................. 3-077563

[51] Int. Cl.$^6$ .................................. G02F 1/1335
[52] U.S. Cl. ...................................... 349/57; 349/61
[58] Field of Search .................... 359/40, 41, 42, 359/49, 50, 62, 86; 362/298; 353/77, 98, 97; 349/57, 61, 67, 68

[56] References Cited

U.S. PATENT DOCUMENTS

| | | |
|---|---|---|
| 4,626,897 | 12/1986 | Sato et al. . |
| 4,671,634 | 6/1987 | Kizaki et al. . |
| 4,722,593 | 2/1988 | Shimazaki . |
| 4,772,098 | 9/1988 | Ogawa . |
| 4,917,465 | 4/1990 | Conner et al. . |
| 4,950,059 | 8/1990 | Roberts . |
| 5,022,750 | 6/1991 | Flask . |
| 5,052,783 | 10/1991 | Hamada et al. . |
| 5,056,912 | 10/1991 | Hamada et al. . |
| 5,098,184 | 3/1992 | van den Brandt et al. . |
| 5,135,300 | 8/1992 | Toide et al. . |
| 5,136,491 | 8/1992 | Kano . |
| 5,142,387 | 8/1992 | Shikama et al. . |
| 5,146,248 | 9/1992 | Duwaer et al. . |
| 5,150,138 | 9/1992 | Nakanishi et al. . |
| 5,161,042 | 11/1992 | Hamada . |
| 5,192,962 | 3/1993 | Nishida et al. . |
| 5,455,694 | 10/1995 | Ariki et al. ........................ 359/40 |

FOREIGN PATENT DOCUMENTS

| | | |
|---|---|---|
| 0440495 | 8/1991 | European Pat. Off. . |
| 60-165622 | 8/1985 | Japan . |
| 61-011788 | 1/1986 | Japan . |

OTHER PUBLICATIONS

Sasaki "Fundamentals and Applications of Liquid Crystal Electronics", Ohm Company, Apr. 1979.
Oikawa et al. "Integrated Planer Microlens and Its Applications", Proceedings at the SPIE, vol. 898, pp. 3–4, Jan. 1988.

Primary Examiner—William L. Sikes
Assistant Examiner—James A. Dudek
Attorney, Agent, or Firm—Antonelli, Terry, Stout & Kraus, LLP.

[57] ABSTRACT

A liquid crystal display includes an illumination optical system which has a light source for emitting light and acts to irradiate the light from the light source on a light bulb on which an optical image is formed in accordance with a video signal, and a transmission-type liquid crystal display element for displaying the image information by the electrooptical effect of the liquid injected between a pair of transparent substrates of the light bulb. The liquid crystal display element is formed of a micro-lens array which has unit lenses provided to oppose the respective picture elements of the picture element array of the liquid crystal and thus to have the same array as the picture element array of the liquid crystal. Since this micro-lens array is closely attached to the side of liquid crystal display element to which the luminous flux emitted from the light source is incident, or integrally formed within the liquid crystal cell substrate, the liquid crystal display element has a high aperture ratio.

29 Claims, 17 Drawing Sheets

FIG. 3
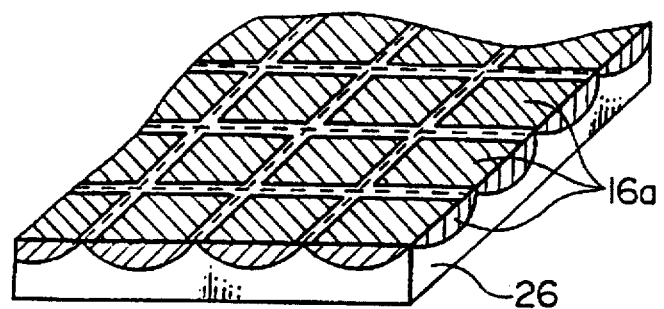
FIG. 4A1
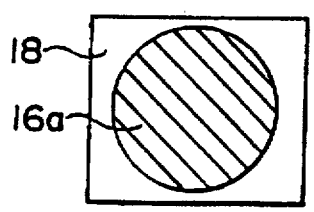
FIG. 4B1
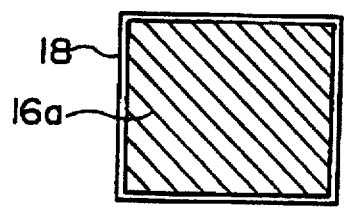
FIG. 4A2
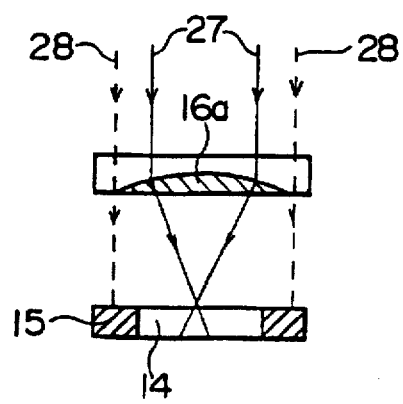
FIG. 4B2
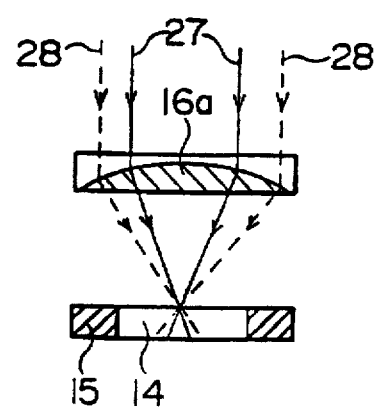

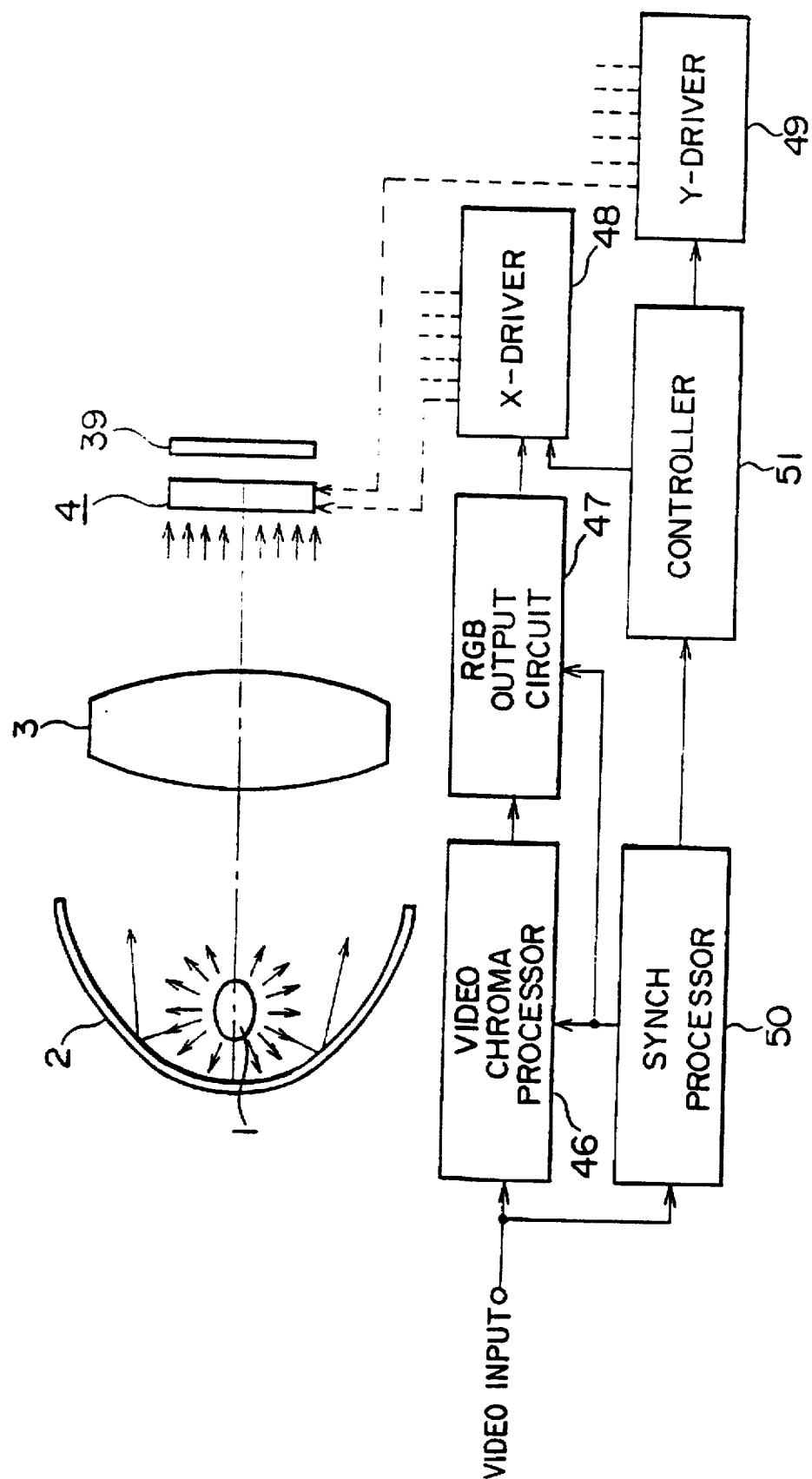

LIQUID CRYSTAL DISPLAY ELEMENT AND MICRO-LENS ARRANGEMENT AND A DISPLAY USING THE SAME

This application is a 37 CFR §160 continuation of prior application Ser. No. 07/852,005, filed Mar. 16, 1992 (allowed) now U.S. Pat. No. 5,435,694.

BACKGROUND OF THE INVENTION

This invention relates to a transmission-type liquid crystal display element which is formed by injecting a liquid crystal between a pair of transparent plates and displays picture information by the electrooptic effect of this liquid, and to a liquid crystal display using this transmission-type liquid crystal element as a light valve.

The twisted-nematic (TN)-type liquid display element as a typical example of the liquid crystal display element has a liquid crystal cell formed of a liquid crystal injected between a pair of transparent plates with transparent electrodes, and two polarizers which are disposed before and after this liquid crystal cell so that their polarizing directions are 90° different. The amount of transmitted light of the incident light is controlled to display picture information by the combination of the polarizing plane rotating action of the electrooptical effect of the liquid crystal and the polarizing component selecting action of the polarizers. The liquid crystal display element is described in detail in, for example, "Fundamentals and Application of Liquid Crystal Electronics" edited by Sasaki and published by a Japanese company, Ohm Company (1979). There are known further three prior arts "Integrated Planar Micro Lens and its Applications" Proc. Soc. Photo. Opt. Instrum. Eng., 898, 3-11 (1988); U.S. Pat. No. 5,052,783; and U.S. Pat. No. 5,056,912. This liquid crystal display element includes metal wiring for electrodes of each picture element, nonlinear elements or switching elements added as means for controlling the individual picture elements, and portions (light shielding portions) not contributing to the display such as the gaps around the electrodes of each picture element. Thus, particularly in this transmission-type liquid crystal display element, the light arrived at the light shielding portions as a part of the light which is emitted from a light source and irradiated on the liquid crystal display element is not transmitted through the liquid crystal display element, and therefore reduces the light-utilization efficiency. This light-utilization efficiency is normally expressed by the aperture ratio of the liquid crystal display element. It is important to increase this aperture ratio. The aperture ratio is defined as follows.

Aperture ratio=(Effective area contributing to the display at one picture element)/(Area of all region of one picture element)

In addition, when the liquid crystal display element is small-sized for a compact display using the liquid crystal display element, the area of one picture element is reduced more as the liquid crystal display element is small-sized, provided that the number of picture elements of the liquid crystal display element is constant. Thus, the effect of the light-shielding portions becomes great, and it is difficult to increase the light intensity. Moreover, in order to increase the definition of the liquid crystal display element with the same size and thereby to increase the resolution of the liquid crystal display using the liquid crystal display element, it is necessary to reduce the pitch of the picture elements. In that case, if all the constituents of the liquid crystal display element can be reduced analogically, the effect of the light-shielding portions are not changed, and the aperture ratio is not changed. However, the width of the metal wiring of electrodes and size of additional devices cannot be reduced to a certain value or below from the viewpoint of etching precision and alignment precision. As a result, the aperture ratio is decreased with the increase of the definition.

Examples of a transmission-type liquid crystal display element improved in the aperture ratio and liquid crystal display using this liquid crystal display element are described in, for example, Japanese Patent Laid-open Gazettes No. 60-165622 and No. 61-11788 in which the liquid crystal display element has a micro-lens array provided.

In either one of the above conventional examples, each unit lens portion of the micro-lens array is a circular lens or a semi-circular cylindrical lenticular lens. Each picture element of the above liquid crystal display element is normally of a square shape or rectangular shape. Therefore, when the micro-lens array (circular) is provided on the liquid crystal display element (square or rectangular), the light incident on the aperture area of each unit lens portion of the micro-lens array can be converged on the aperture area of the liquid crystal display element, but the light incident on the other area is incident to the light-shielding portions. Thus, all the incident light cannot effectively enter each unit lens portion, and as a result the improvement of the aperture ratio is limited.

Moreover, the liquid crystal display element has generally a large dependency on the visual angle. The liquid crystal display element can exhibit good characteristics for the viewers when it is looked up at an angle relative to the direction perpendicular to the display screen. Thus, when the liquid crystal display element is disposed to be tilted relative to the incident light, the incident light to the micro-lens array of the conventional liquid crystal display element is not converged just at the aperture area of the liquid crystal display element.

Also, in the display using the liquid crystal display element with the micro-lens array and an illumination optical system or in the projection-type display using a screen on which the image on the liquid crystal display element is projected through a projection lens, the aperture ratio improvement effect of the liquid crystal display element with the micro-lens array is changed by the illumination optical system. However, this is not considered in the above conventional liquid crystal display element and display using the same.

SUMMARY OF THE INVENTION

Accordingly, it is an object of the invention to solve the problems in the prior art and provide a liquid crystal display element capable of effectively using all the light incident to the liquid crystal display element, thus greatly improving the aperture ratio.

It is another object of the invention to provide a bright, compact and good-performance liquid crystal display using a liquid crystal display element and an illumination optical system which has a high light utilization efficiency for the light from a light source, a small number of parts such as lenses, is compact, and can further improve the effect of the liquid crystal display element of which the aperture ratio is greatly improved.

According to this invention, there is provided, in order to solve the above problem, a liquid crystal display having a light source 1 for emitting light, an illumination optical system for irradiating the light from the light source 1 onto a liquid crystal display element 4 in which an optical image according to a video signal is formed, and said liquid crystal display element 4 as a transmission-type liquid crystal display element which has a pair of transparent plates 11 and a liquid crystal injected therebetween and displays picture information by the electrooptical effect of the liquid crystal, wherein a flat micro-lens array 16 having an array of unit lenses respectively opposing to the picture elements of the picture element array of the liquid crystal display element and having the same array as the picture element array of the liquid crystal is provided to be in intimate contact with the surface of the liquid crystal display element to which the light from the light source is incident or to both surfaces thereof including the surface from which the incident light exits or to be integral with the transparent plates 11, and the focal points of these unit lenses are formed at around the liquid crystal surface of the liquid crystal display element and substantially at the center of the& electrodes of the picture elements. In addition, the flat micro-lens array 16 is formed as a refractive-index distribution-type flat plate micro-lens array in which regions of a refractive index N different from the refractive index $N_0$ are periodically formed within the substrate. Also, the micro-lens array 16, or the refractive-index distribution-type flat plate micro-lens array is formed by overdiffusion so that the shapes of the regions acting as the unit lenses are, respectively, equal or substantially equal to the picture elements of the liquid crystal display element 4.

In the liquid crystal display using the liquid crystal display element according to this invention, the illumination optical system including the light source is constructed as follows. The illumination optical system has the light source 1 for emitting the light, and a concave mirror 2 and condenser lens group 3 for irradiating the light from the light source 1 onto the light valve 4 on which an optical image according to a video signal is formed. The concave mirror 2 is formed elliptical, and the light source 1 is provided at around the elliptical focal point close to the center of the elliptical concave mirror 2a. The condenser lens group 3 or a part thereof is provided at around the elliptical focal point of the concave mirror 2a on the side facing the liquid crystal display element 4. Alternatively, the concave mirror 2 is formed parabolic, and the condenser lens group 3 having a positive refractive power or a part thereof is provided at around the side of the concave mirror 2b from which the light from the light source 1 exits.

Moreover, the illumination optical system is constructed so that the light source 1 and the concave mirror 2 are formed approximately similar to the shape of the aperture of each picture element of the liquid crystal display element 4 through which light is transmitted, in the cross-section perpendicular to the optical axis of the illumination optical system.

According to the liquid crystal display element of the invention constructed as mentioned above, the incident light is effectively conducted to the picture element electrodes, and is almost not "eclipsed" by the metal wiring of electrodes, nonlinear devices or switching devices added as means for controlling the picture elements individually, and the gaps around the picture element electrodes (light-shielding portions) not contributing to the display. Thus, bright picture information can be displayed even if the aperture ratio is poor (small). In addition, according to this invention, since the light exiting from the liquid crystal display element is only the effective light for the display, the opaque portions between the picture elements are eliminated, and thus picture information can be smoothly displayed.

Also, according to the illumination optical system of the above construction, since the light from the light source is once focused by the refractive power of the condenser lens group properly located, and light at around the focal point can be controlled, it is not necessary to increase the aperture of the condenser lens, and the incident angle of light to the liquid crystal display element or the micro-lens array relative to the optical axis can be decreased to improve the focusing characteristic of the micro-lens array, so that the light utilization efficiency can be increased. Furthermore, since the shape of the luminous flux passing through the apertures in the cross-section perpendicular to the optical axis, or the shape of the light source as viewed from the micro-lens, or the shape of the light source in the cross-section perpendicular to the optical axis, is approximately similar to the shape of the apertures, the luminous flux passing through the apertures of the liquid crystal display element covers all the range of the apertures, so that the liquid crystal display has a large aperture ratio, or is able to display bright and clear picture information.

BRIEF DESCRIPTION OF THE DRAWINGS

FIG. 3 is a perspective view of the flat micro-lens array shown in FIG. 1.

FIGS. 4A1, 4B2 and 4B1 and 4B2 are diagrams showing the flat micro-lens array of FIG. 1 and the action thereof.

FIGS. 13A to 13D are diagrams of a livid crystal display and projection-type liquid crystal display concerning one embodiment of the invention which uses a liquid crystal display element of the above embodiments of the invention.

DESCRIPTION OF THE PREFERRED EMBODIMENTS

Figure 1:
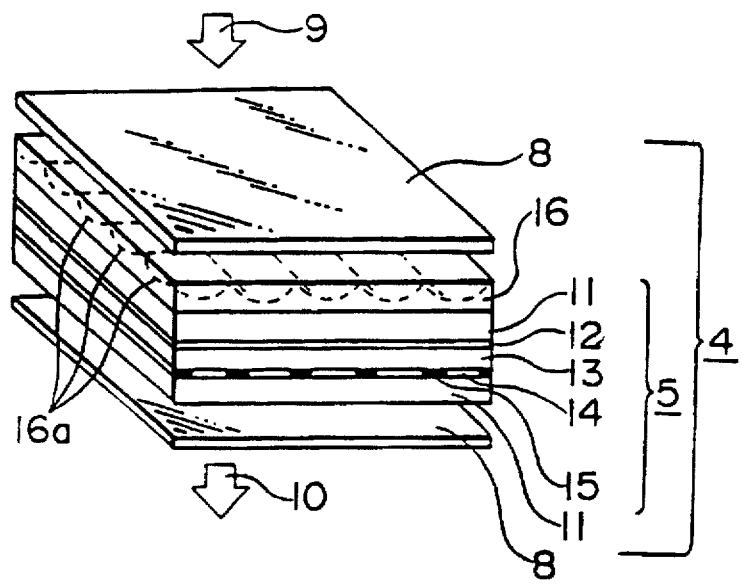
FIG. 1 is a perspective view of a liquid crystal display element of one embodiment of the invention.
Figure 2:
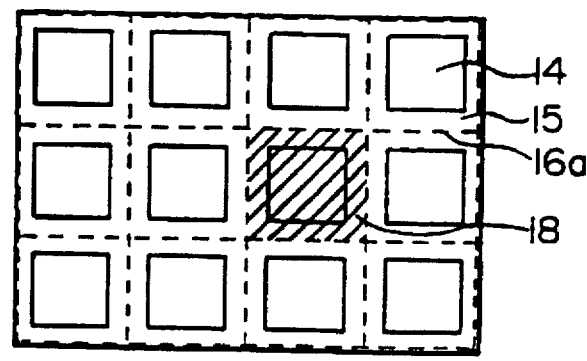
FIG. 2 is a typical plan view showing the positional relation among the constituents shown in FIG. 1.

Embodiments of the invention will be described with reference to FIGS. 1 to 23. FIG. 1 is a perspective view of a liquid crystal display element of one embodiment of the invention. FIG. 2 is a typical plan view showing the positional relation among the elements constituting the liquid crystal display element of FIG. 1.

Referring to FIG. 1, there are shown a pair of transparent substrates 11, 11, a transparent opposite electrode 12 provided on the surface of one transparent substrate 11 opposite to the other substrate, and a transparent picture element electrode 14 provided on the side of the other transparent substrate 11 opposite to the one substrate. In addition, a liquid crystal 13 is enclosed between the pair of transparent substrates 11, 11. Shown at 15 are light-shielding portions which are provided on the other transparent substrate 11 so as not to contribute to the display operation, such as the metal wiring of electrodes, nonlinear devices or switching devices added as means for individually controlling the picture elements. These elements 11, 12, 13, 14 and 15 (the structure between a pair of transparent substrates 11, 11) are hereinafter generally referred to as a liquid crystal cell 5.

Shown at 16 is a flat-plate micro-lens array which is provided to be in intimate contact with the outer surface of the one transparent substrate 11. This lens-array is a refractive index distribution type micro-lens array which is produced by subjecting a transparent flat glass substrate to ion exchange. This lens-array is substantially a two-dimensional lens-array of a great number of unit lenses 16a arranged in rows and columns as indicated by broken lines in FIG. 1. Shown at 8, 8 are polarizing plates which are provided on the outer sides of the transparent substrates 11, 11. Although the polarizing plates 8 are separated from each other as illustrated, they may be made in intimate contact with each other. These liquid crystal cell, flat-plate micro-lens array, and polarizing plates constitute a liquid crystal display element 4. The flat-plate micro-lens array 16 is thus always provided on the light-incident side, 9 of the liquid crystal cell 5.

The positional relation and shapes of the main elements in this embodiment of the invention will be described with reference to FIG. 2. In FIG. 2, there is shown a shaded region 18 which corresponds to one picture element within the liquid crystal cell 5. The area surrounded by the solid line within the shaded region 18 is the picture element electrode 14 (, or the aperture) effective to the display. The other areas are for the light-shielding portions 15 such as the metal wiring and the switching devices. Each region surrounded by broken lines has a shape similar to the shape of an individual unit lens 16a of the flat-plate micro-lens array 16. In this embodiment, as will be obvious from FIG. 2, the shapes and array of the individual lenses (a group of unit lenses 16a) of the flat-plate micro-lens array 16 are made coincident with those of the regions 18 within the liquid crystal cell 5.

FIG. 3 is a typical perspective view of a part of the flat-plate micro-lens array of FIG. 1.

The flat-plate micro-lens array 16 shown in FIG. 3 is the so-called refractive index distribution-type flat-plate micro-lens array, which is formed within, for example, a transparent flat-plate glass substrate 26 having a refractive index $N_0$ so that the regions for unit lenses having a different refractive index N from $N_0$ can be periodically created. This refractive index distribution-type flat-plate micro-lens array can be produced by, for example, ion exchange process.

According to the ion exchange process, a mask layer of a necessary pattern made of, for example, metal is formed on the transparent flat-plate glass substrate 26, and this substrate with the mask layer is immersed in a salt solution bath. At this time, positive ions such as Na+ (sodium ions) and K+ (calcium ions) contained in the glass are exchanged with the positive ions such as Tl+ (thallium ions) contained in the salt solution through the exposed surfaces of the glass. The ion-exchanged regions have a different refractive index from the original refractive index of the glass, and thus form refractive index distribution regions (unit lenses 16a) having a light refracting action. Since the micro-lenses formed by the ion exchange process have a lens action for refracting light within the transparent flat-plate glass substrate 26, the flat-plate micro-lens array 16 is flat in its surface. Also, by adjusting the shape of the mask layer of a necessary pattern and the time for the ion exchange (over-diffusion), it is possible to produce a two-dimensional matrix-shaped buried refractive index distribution-type lens array of which the unit lenses 16a of a flat shape such as a square or rectangle opposite to the respective picture elements of the liquid crystal cell have apparently no distance between the adjacent ones. This is the feature of this invention different from the conventional one. This effect will be mentioned below.

FIGS. 4A and 4B are diagrams to which reference is made in explaining the action of the flat-plate micro-lens array 16 of this embodiment.

FIG. 4A shows the region (unit lens 16a) of a circular shape as in the prior art, having the lens action of, for example, a refractive index distribution-type region, as a micro-lens opposing to one picture element of the liquid crystal display element. Light rays 27 incident to the unit lens 16a are, as illustrated, refracted by the lens action and transmitted through the liquid crystal display element without being blocked by its light-shielding portion 15. However, when the unit lens 16a is circular as shown, a gap is present between the unit lens 16a and the opposite picture element adjacent to the unit lens 16a since the region 18 corresponding to one picture element of the crystal display element is normally rectangular or square as illustrated. Thus, as shown in FIG. 4A, light rays 28 incident to the gap arrive at the light-shielding portion 15 of the liquid crystal display element, and hence cannot be transmitted through the liquid crystal display element. On the other hand, according to the embodiment, since the region with lens action which is for example a refractive index distribution region is formed as unit lens 16a having the same flat shape as that of the region 18, opposing the region 18 corresponding to one picture element of the liquid crystal display element as shown in FIG. 4B, the light rays 28 are refracted by the lens action so as not to arrive at the light-shielding portion 15 of the liquid crystal display element but to be transmitted through the liquid crystal display element. Consequently, as compared with the construction shown in FIG. 4A, light transmitted through the liquid crystal display element shown in FIG. 4B is increased, and thus the aperture ratio can be apparently improved to a great extent, or the liquid crystal display element is bright. In this case, the region having the lens action within the transparent flat-plate glass substrate 26, may be formed either on the side of the glass substrate facing the liquid crystal cell or on the opposite side as shown in FIG. 5.

Figure 5:
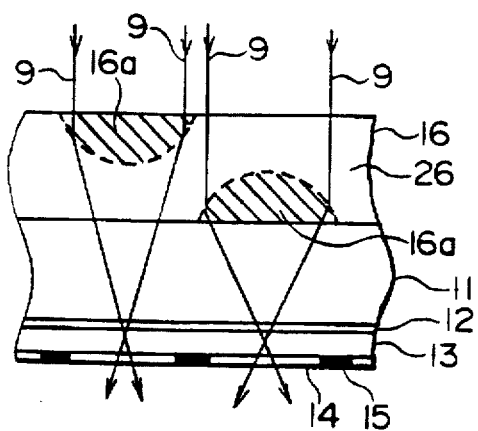
FIG. 5 is a typical cross-sectional diagram of a main part of the liquid crystal display element shown in FIG. 1.

FIG. 5 is a cross-sectional diagram typically showing a main portion of the liquid crystal display element of FIG. 1. Although, for convenience of explanation, two regions (unit lenses 16a) having the lens action within the transparent flat glass substrate 26 of the flat-plate micro-lens array 16 are formed at different positions in the left and right halves, respectively, the unit lens 16a is formed from either side of the transparent flat glass substrate 26. In practice, it may be formed from either side or both side. In the embodiment shown in FIG. 1, the unit lenses are formed in the opposite side of the glass substrate to the transparent substrate 11 of the liquid crystal cell 5 for convenience of explanation. However, it is more advantageous in performance and manufacturing technique to form it on the side facing the transparent substrate 11 because the focal distance of the lens is short.

Figure 6A:
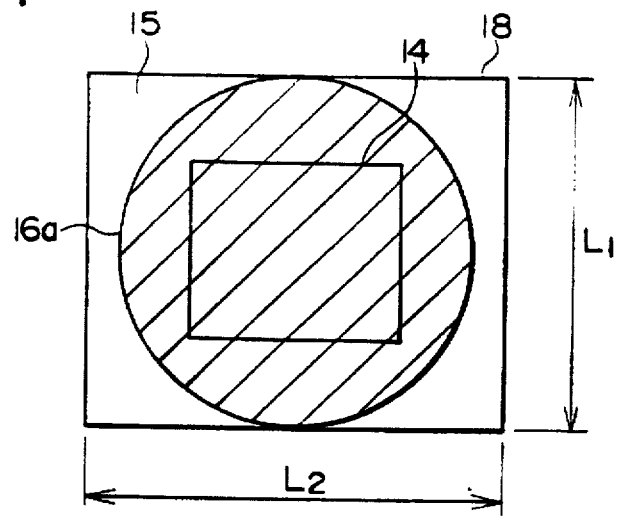
FIGS. 6A and 6B are plan views of modifications of the flat micro-lens array shown in FIG. 1.
Figure 6B:
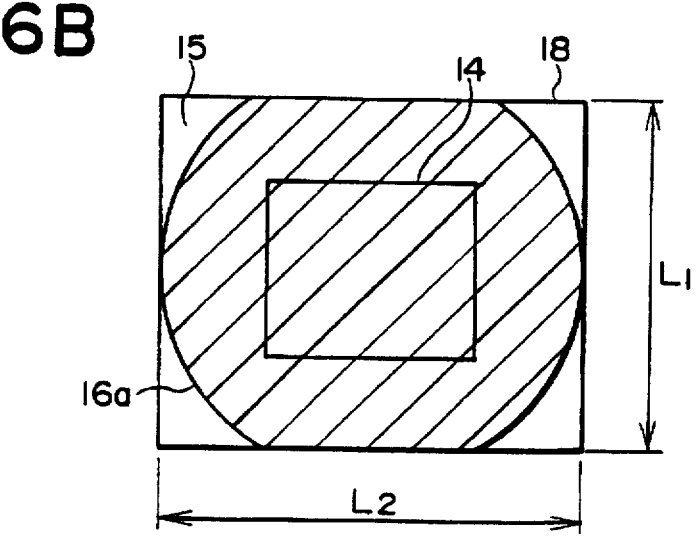

While in the flat-plate micro-lens array 16 of this embodiment the shape of the unit lens 16a completely coincides with that of the region 18 corresponding to one picture element of the liquid crystal display element, it may be the shape as for example shown in FIGS. 6A and 6B which is possible in the above lens-producing process. In this case, the aperture ratio can be, substantially similarly as above, increased as compared with the prior art, that is, this liquid crystal display element is bright.

FIGS. 6A and 6B are plan views of modifications of the flat-plate micro-lens array 16 of the liquid crystal display element of the embodiment, showing the shapes of the unit lens 16a.

The region 18 corresponding to one picture element of the liquid crystal cell is normally square or rectangular as illustrated. Thus, it is assumed that the region 18 has a rectangular shape with one side length of $L_1$ and the other side length of $L_2$ in which is shorter than $L_2$. In addition, it is assumed that the region 18 includes the picture element electrode 14 as the aperture and the light-shielding portion 15. When the unit lens 16a of the flat-plate micro-lens array 16 is realized to be circular as in the prior art, the maximum diameter of each unit lens 16a is as shown in FIG. 6A. As a result, the light rays incident to the other area than the unit lens 16a (lens aperture), of the light incident to the region 18 corresponding to one picture element, cannot be effectively utilized. Thus, when the unit lens 16a is formed to be equal to the shape of the region 18 in order to effectively utilize all the light incident to the region 18 corresponding to one picture element, it is possible to form the flat-plate micro-lens array having the unit lens 16a of the shape shown in FIG. 6B by the process for producing the unit lenses 16a of the same shape as the region 18 mentioned in the above embodiment (for example, the ion exchange process). In this case, substantially the same liquid crystal display element as in the above embodiment can also be obtained which has an apparently improved aperture ratio or is bright as compared with the prior art. As a result, if the shaded area, S of the unit lens 16a of the flat-plate micro-lens array shown in FIGS. 6A and 6B satisfies the following conditions:

(1) When the region 18 corresponding to one picture element of the liquid crystal cell is $L_1 < L_2$, $$\pi(L_1/2)^2 < S \le L_1 \cdot L_2 \tag{1}$$

(2) When the region 18 corresponding to one picture element of the liquid crystal cell is $L_1 = L_2$, $$\pi(L_1/2)^2 < S \le L_1^2 \tag{2}$$

then the flat-plate micro-lens array having the unit lenses 16a formed has a smaller improvement in the aperture ratio than the above embodiment, but can be formed (produced) in a shorter time than the above embodiment, thus having a high productivity such as cost reduction capability.

The above-mentioned action is concerned with the incident light ray 9 parallel to the optical axis of the lens. A description will be made of the flat-plate micro-lens array in which the incident light ray 9 is incident to the lens at an angle relative to the optical axis of the lens with reference to FIGS. 7A and 7B.

Figure 7A:
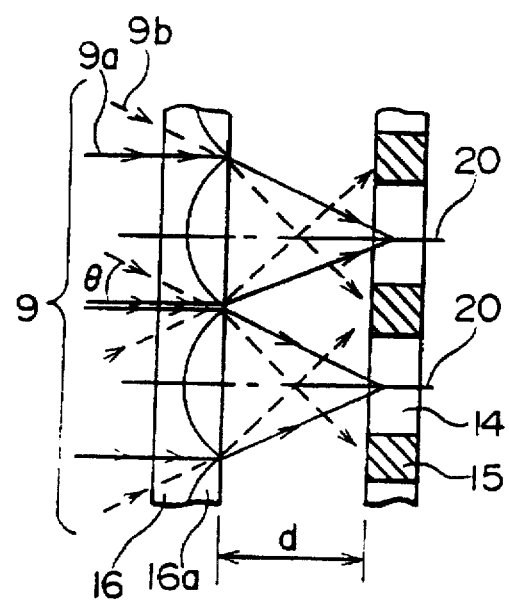
FIGS. 7A and 7B are diagrams useful for explaining the principle of the relation between the incident light and the flat micro-lens array in a modification of the embodiment of FIG. 1.

In FIG. 7A, when the flat-plate micro-lens array 16 is provided on the liquid crystal cell, incident light 9a to the micro-lens array in parallel with the optical axis 20 of the array is focused at around the focal point of each unit lens of the array as described above, or the parallel light incident to the light valve is all passed through the picture element electrode 14 (namely, the aperture) without arriving at the light-shielding portion 15.

On the other hand, when the light ray 9b is incident to the flat-plate micro-lens array 16 at an angle θ as in FIG. 7A, the light ray 9b may not be focused on the picture element electrode 14, but incident to the light-shielding portion 15. Thus, for a bright picture, it is desired that all the light rays be incident to the flat-plate micro-lens array 16 at small incident angles, that the distance (d in FIG. 7A) between the flat-plate micro-lens array 16 and the picture element electrode (liquid crystal surface) be small, and that the micro-lens shape be set to be optimum according to the construction of the light source and the illumination optical system.

Figure 7B:
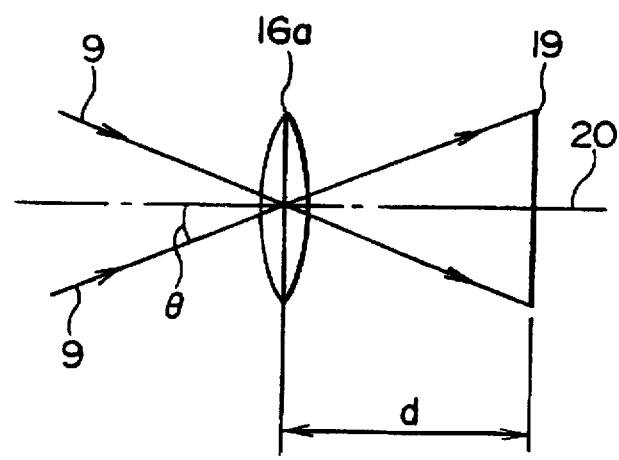

FIG. 7B is a more typical diagram of the lens array than FIG. 7A. In FIG. 7B, there are shown the single unit lens 16a of the flat-plate micro-lens array 16, the optical axis 20 of the lens, and the liquid crystal surface 19. When the light ray 9 from the light source is incident to the unit lens 16a at an angle θ relative to the optical axis 20 of the lens, the size, P of the image of the light source at the liquid crystal surface 19 is approximated to the value given by $$P = 2 \cdot d/n \cdot \tan \theta \tag{3}$$

where d is the distance from the back-side main point of the unit lens 16a to the liquid crystal surface 19, and n is the refractive index of the medium from the unit lens 16a to the liquid crystal surface 19. Thus, if conditions are set so that the diagonal length, D of the picture element electrode 14 (, or the aperture) within the region 18 corresponding to one picture element shown in FIG. 2 satisfies the following relation derived from the equation (3), $$D \geq 2 \cdot d/n \cdot \tan\theta \qquad (4)$$

the light utilization efficiency dependent on the aperture ratio can be greatly improved over that in the prior art, or the apparent aperture ratio can be increased. Moreover, other means for improving the aperture ratio will also be given as shown in FIG. 8.

Figure 8:
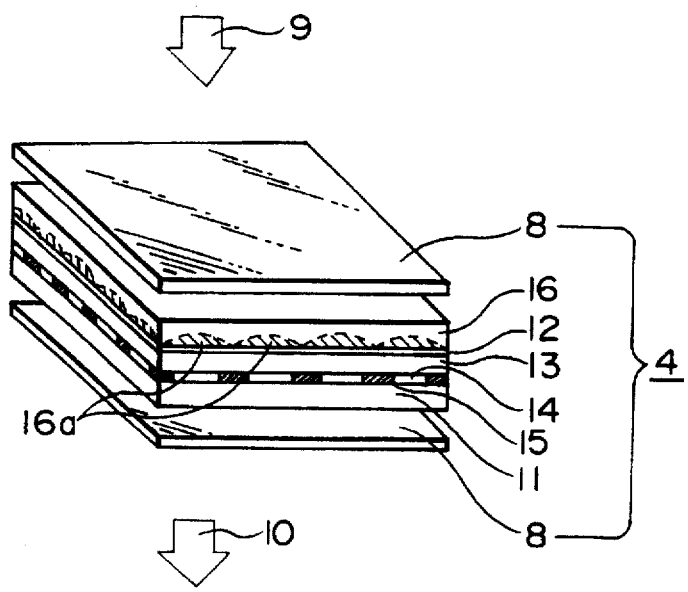
FIG. 8 is a perspective view of a liquid crystal display element of another embodiment of the invention.

FIG. 8 is a perspective view of the liquid crystal display element of a second embodiment of the invention. In FIG. 8, like elements corresponding to those in FIG. 1 are identified by the same reference numerals, and will not be described in detail.

Referring to FIG. 8, there is shown the flat-plate micro-lens array 16 which is formed in the one transparent substrate 11 of the liquid crystal cell 5 (integrally formed with the substrate 11). The structure of liquid crystal display element of this embodiment is different in this point from that of FIG. 1. In other words, the transparent substrate 11 which can be apparently maintained at a high precision as described above is satisfactory for the flat-plate micro-lens array 16 of the refractive index distribution type, and thus it is formed within the one transparent substrate 11. The shape of each lens (unit lens 16a) of the micro-lens array 16 is the same as that of the region 18 corresponding to one picture element of the liquid crystal cell shown in FIG. 2, and the array is also the same as that of the liquid crystal cell. The refractive index distribution region of the micro-lens array 16 may be provided on either side of the substrate as shown in FIG. 5. Although not shown, a protective film is coated between the micro-lens array 16 and the liquid crystal 13 in order to protect the liquid crystal from being deteriorated by the alkaline ion dissolving from the micro-lens array 16.

In the embodiment of such construction, since the distance from the back-side main point of the unit lens 16a to the liquid crystal surface 19 can be greatly reduced, the aperture ratio is almost not dependent on the angle of incidence of light.

Figure 9:
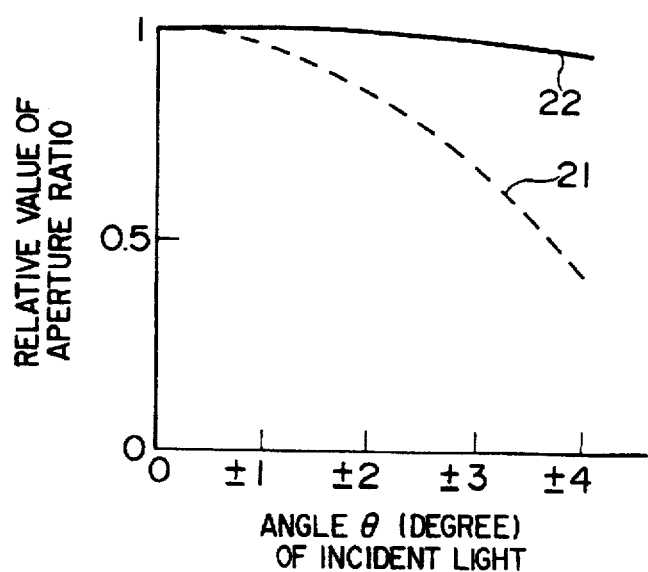
FIG. 9 is a graph showing the aperture ratio with respect to the incident angle of light in the embodiments shown in FIGS. 1 and 8.

FIG. 9 is a graph of the aperture ratio with respect to the angle of incidence of light for the array-on-substrate structure of liquid crystal cell 5 shown in FIG. 1 and the array-in-substrate structure shown in FIG. 8.

In FIG. 9, the abscissa is the angle of incident light to the optical axis of lens, and the ordinate is the relative value of aperture ratio. The characteristic curve, 21 indicated by a broken line shows the structure in which the flat-plate micro-lens array 16 is formed on the transparent substrate 11 in intimate contact therewith, and the characteristic curve, 22 indicated by a solid line shows the structure in which the flat-plate micro-lens array 16 is integrally formed within the transparent substrate. From FIG. 9, it will be seen that the aperture ratio of the solid line 22 is almost not changed with the increase of the angle of incident light since the distance from the back-side main point of the unit lens to the liquid crystal surface in the array-in-substrate structure can be greatly reduced as compared with the array-on-substrate structure. However, for the array-on-substrate structure, the above-given conditions are satisfied, the same effect as in the array-in-substrate structure can be achieved.

Figure 10:
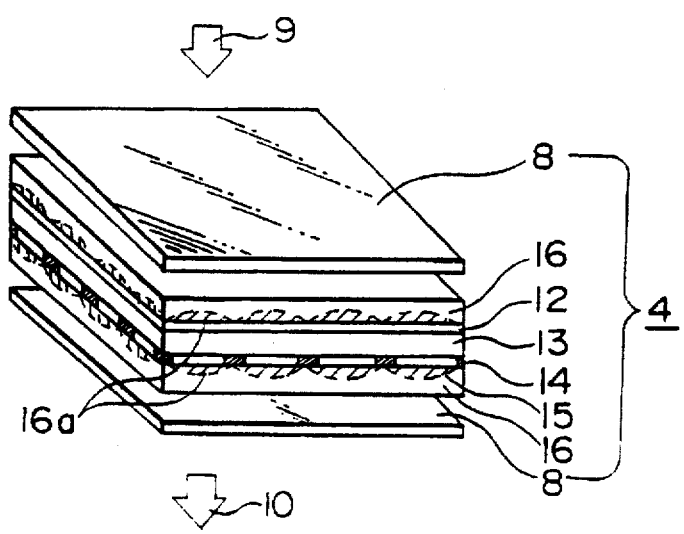
FIG. 10 is a perspective view of a liquid crystal display element of still another embodiment of the invention.

FIG. 10 is a perspective view of still another embodiment of the liquid crystal display element of the invention. In FIG. 10, like elements corresponding to those in FIGS. 1 and 2 are identified by the same reference numerals and will not be described in detail.

This embodiment shown in FIG. 10 is different from the above embodiments in that the flat-plate micro-lens arrays 16, 16 are provided on both sides of the liquid crystal display element. The liquid crystal display element 4 shown in FIG. 10 corresponds to such construction that the micro-lens array 16 is additionally formed in the transparent substrate, 11 on the light-exiting side in FIG. 8. The action of this embodiment will be mentioned with reference to FIG. 11.

Figure 11:
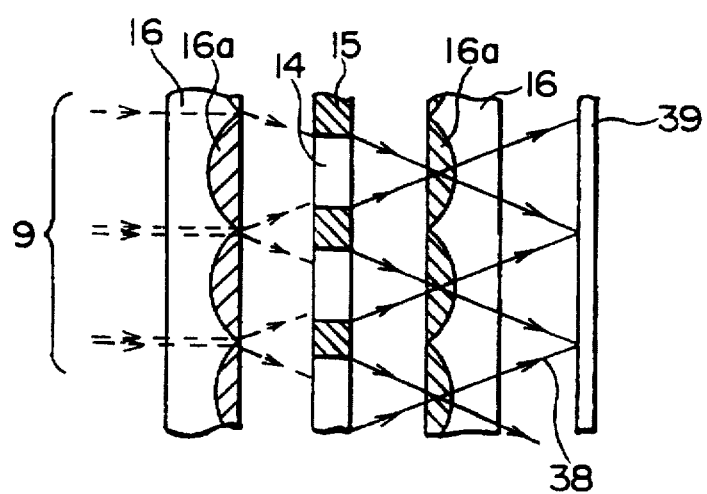
FIG. 11 is a diagram useful for explaining the principle of the action of both side flat micro-lens array shown in FIG. 10.

FIG. 11 is a typical cross-sectional diagram of a main part of the structure shown in FIG. 10. The flat-plate micro-lens array 16a on the incident-light 9 side in FIG. 11 acts to increase the aperture ratio as described with reference to FIGS. 4A, 4B to FIG. 9. In addition, the flat-plate micro-lens array 16b provided on the exiting-light 38 side of the picture element electrode 14 of the liquid crystal display element 4 acts as a lens having a correct refractive power to the exiting light 38. Thus, the image on the picture element electrode 14 can be formed by this action on a flat surface such as a diffusion plate 39. The flat-plate micro-lens array 16b, its location and the location of the diffusion plate 39 are set so that the images on the picture element electrodes 14 corresponding to the respective picture elements of the liquid crystal display element 4 can be formed on the diffusion plate 39 without any gap. Thus, the image of the light-shielding portion 15 in the liquid crystal display element 4 can be prevented from being formed on the diffusion plate 39. Therefore, if the image on the diffusion plate 39 is magnified and projected by a projection lens onto the screen, the shades of the light-shielding portions 15 are not projected, and hence a bright and clear picture can be displayed.

In the embodiment shown in FIG. 10, a thin substrate such as a glass plate or a protective layer for protecting the electrode and flat-plate micro-lens array from damage due to heat or other may be provided between each flat-plate micro-lens array 16, 16 and a layer including the opposing electrode 12 and picture element electrode 14.

Figure 12A:
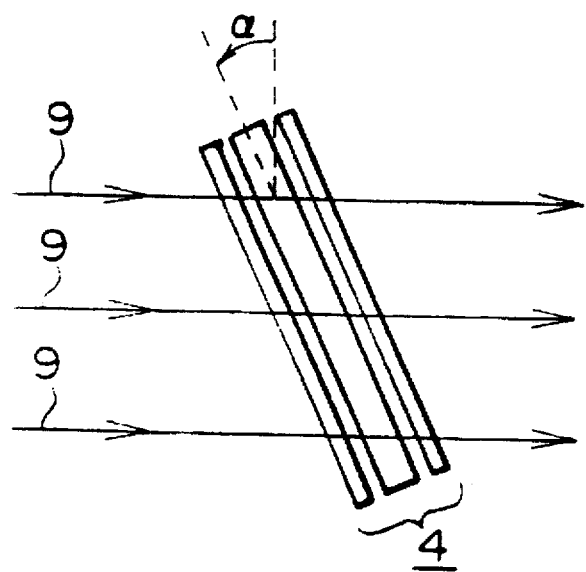
FIGS. 12A and 12B are diagrams useful for explaining the principle of liquid crystal display elements of modifications of the above-given embodiments of the invention.

A description will be made of an application of this invention to the twisted nematic mode (TN) as a peculiar example of the liquid crystal operation mode. The liquid crystal display element of the invention generally has a great view-angle dependency. The view angle for good characteristics in the TN mode liquid crystal device is different from the direction perpendicular to the display screen. Thus, as shown in FIG. 12A, the liquid crystal display element 4 of this embodiment should be tilted relative to the incident light 9 for achieving a bright picture. Therefore, it is necessary to correct the positional relation between the flat-plate micro-lens array and the picture element electrodes within the liquid crystal cell (specifically, to move the optical axis of the flat-plate micro-lens array in parallel in accordance with the incident angle of the incident light). The condition for this correction will be described with reference to FIG. 12B.

Figure 12B:
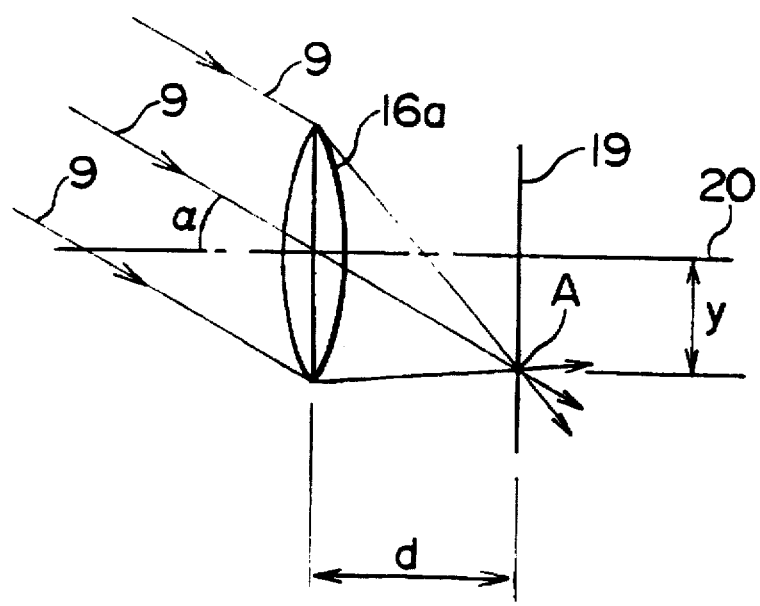

FIG. 12B is an explanatory diagram for explaining the principle of the liquid crystal display element of a modification of the first, second and third embodiments. In FIG. 12B, there is shown the single unit lens 16a of the flat-plate micro-lens array 16. The flat-plate micro-lens array 16 in this modification is formed on the transparent substrate in intimate contact therewith as in the embodiment shown in FIG. 1 or formed within the transparent substrate as shown in FIG. 8. The shape of the unit lens 16a of the flat-plate micro-lens array 16 is the same as the region (the region 18 in FIG. 2) corresponding to one picture element within the liquid crystal cell as shown in FIG. 2 or the same as shown in FIGS. 6A and 6B. In addition, the arrangement of the unit lenses 16a is the same as that of the picture elements of the liquid crystal cell. In FIG. 12B, there are also shown the liquid crystal surface 19 and the optical axis of the unit lens.

Point A in FIG. 12B indicates the center of the electrode of one picture element opposing a predetermined one of the unit lenses 16a. When the liquid crystal surface 19 is tilted at an angle of α to the incident light, the amount, y of displacement of the point A from the optical axis 20 of the unit lens 16a is given by $$y = d/n \cdot \tan \alpha \tag{5}$$

where d is the distance from the back-side main point of the unit lens 16a to the liquid crystal surface 19, and n is the refractive index of the medium from the unit lens 16a to the liquid crystal surface 19. In other words, if the above equation is satisfied for a tilted condition of the liquid crystal display element, the light utilization efficiency dependent on the aperture ratio can be greatly improved as compared with the prior art.

Figure 13B:
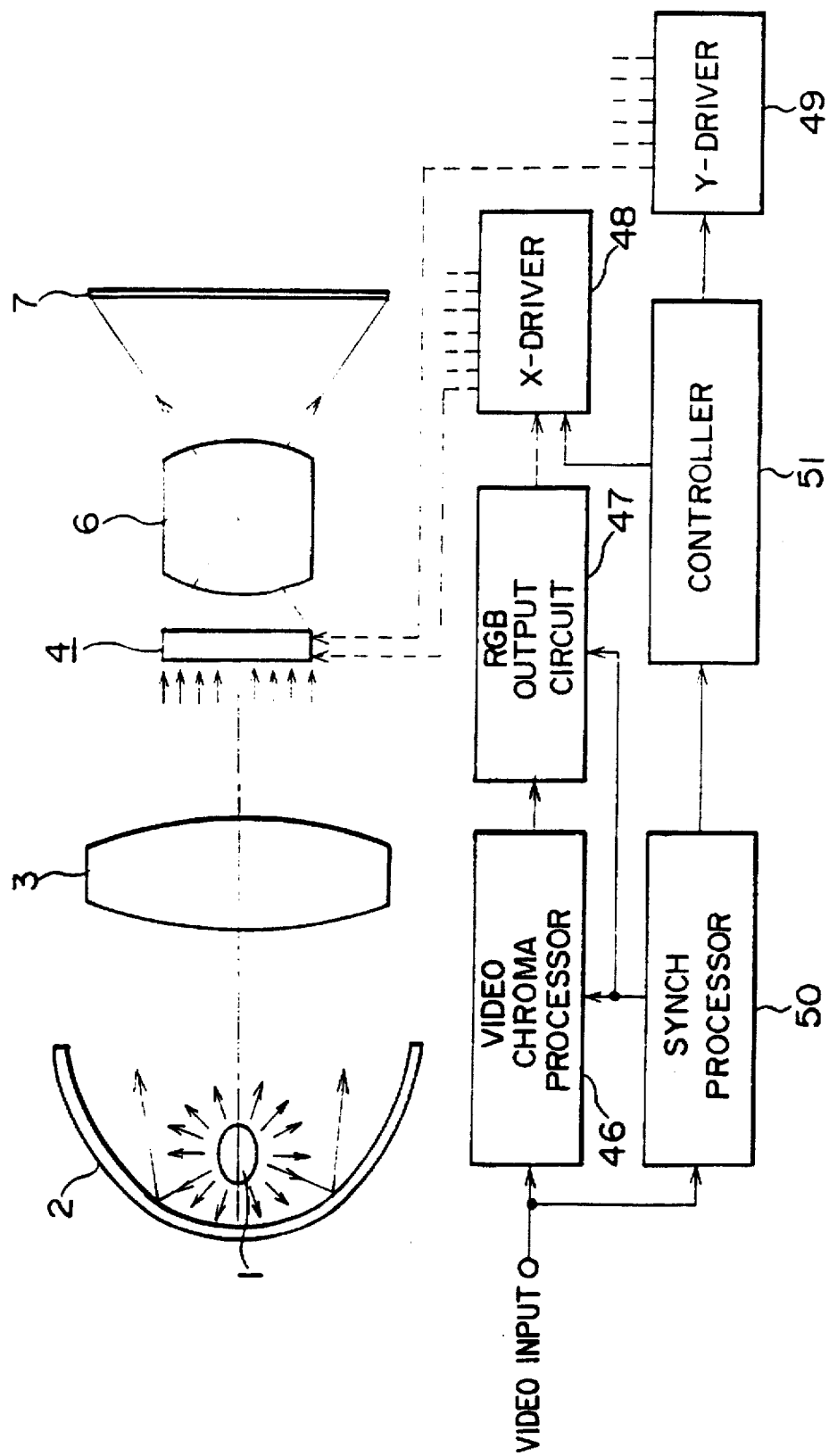
Figure 13C:
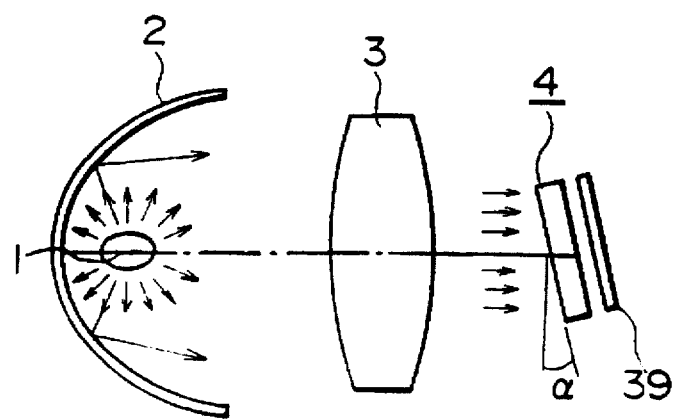
Figure 13D:
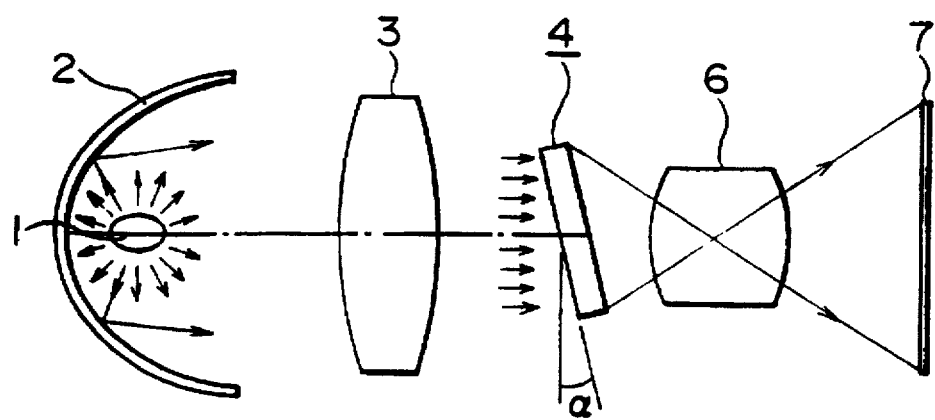

A description will be made of an embodiment of the liquid crystal display which more effectively utilizes the liquid crystal display element of the invention as a light valve and which is another object of the invention. FIGS. 13A and 13B are diagrams of one embodiment of the liquid crystal display using the liquid crystal display element shown in FIGS. 12A and 12B as a light valve. FIGS. 13A and 13C are diagrams of the liquid crystal display having an illumination system including a light source, showing the principle of the construction. FIGS. 13B and 13D are diagrams of the projection type liquid crystal display having an illumination system including a light source and a projection system, showing the principle of the construction.

In FIGS. 13A and 13C, there are shown a light source 1 (white light source) such as a metal halide lamp or halogen lamp, a concave mirror 2, and a condenser lens group 3. The light valve is constructed by the liquid crystal display element 4. The light bulb in FIG. 13C is the liquid crystal display element 4 shown in FIG. 12A. Referring to FIG. 13A, white light exiting from the light source 1 is reflected from a reflecting mirror such as the concave mirror 2 or part of the light is directly passed through the condenser lens group 3 and incident to the liquid crystal display element 4. The incident light to the liquid crystal display element 4 is effectively conducted by the action of the flat-plate microlens array into the picture element electrodes (apertures). Thus, the image on the liquid crystal surface can be projected on the diffusion plate 39 without any loss of light utilization efficiency due to the light-shielding portion, or bright picture information can be obtained. In addition, a drive circuit is provided for the liquid crystal display element 4. That is, an input video signal from, for example, a laser disk, VTR or other source is supplied to a video chrome processing circuit 46 and then to an RGB output circuit 47. The RGB output circuit 47, to AC-drive the liquid crystal display element 4, inverts the polarity of the video signal corresponding to R, G, B at every vertical periods, and supplies the output to an X driver 48. The output from the X driver is supplied to the electrodes of the liquid crystal display element 4. The video chroma processing circuit 46, the RGB output circuit 47, the X driver 48, and a Y driver 49 are synchronized with each other by a synchronizing processing circuit 50 and a controller 51. In FIG. 13C, the liquid crystal display element 4 is tilted at an angle of α to the incident light 9 in order to improve the visual characteristics and to satisfy the condition mentioned with reference to FIGS. 12A and 12B. The driving circuit is shown in FIG. 13A.

In the projection type liquid crystal display shown in FIGS. 13B and 13D, the light from the light source is irradiated on the liquid crystal display element 4, and the picture information on the display device is magnified and projected on a screen 7 by a projection lens 6 so that bright picture information can be seen. In this embodiment, since the liquid crystal display element 4 used as the light valve is single, for color display it is of course necessary to provide a color filter within the liquid crystal cell, though not shown.

FIGS. 14A, 14D to FIG. 16 show various constructions of the illumination optical system in the first embodiment of the liquid crystal display element of the invention shown in FIGS. 13A to 13D.

Figure 14A:
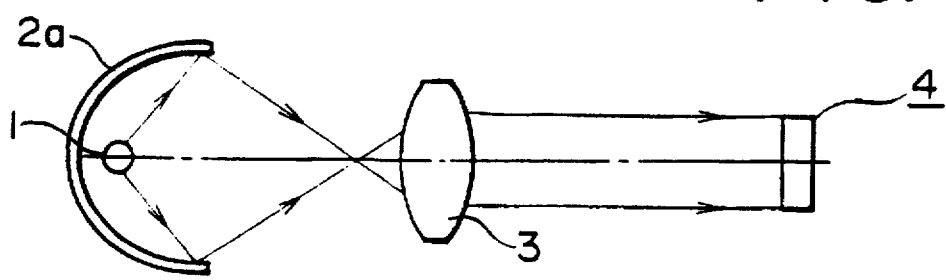
FIGS. 14A to 14D are diagrams showing examples of the construction of the illumination optical system in FIGS. 13A to 13D.
Figure 14B:
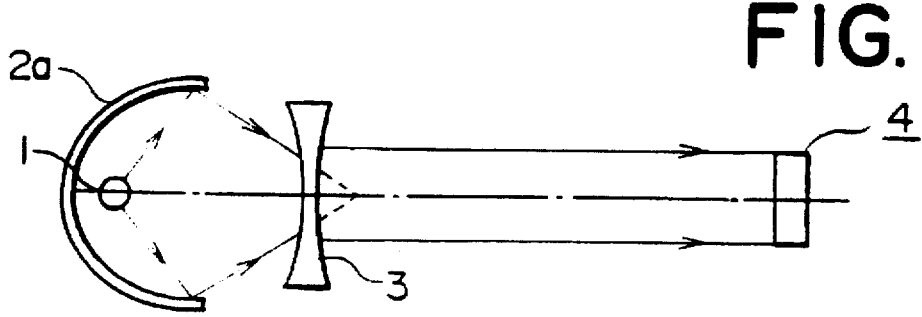
Figure 14C:
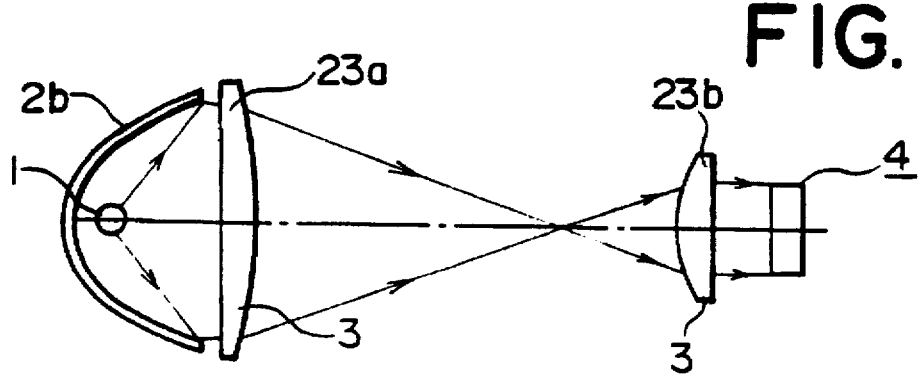
Figure 14D:
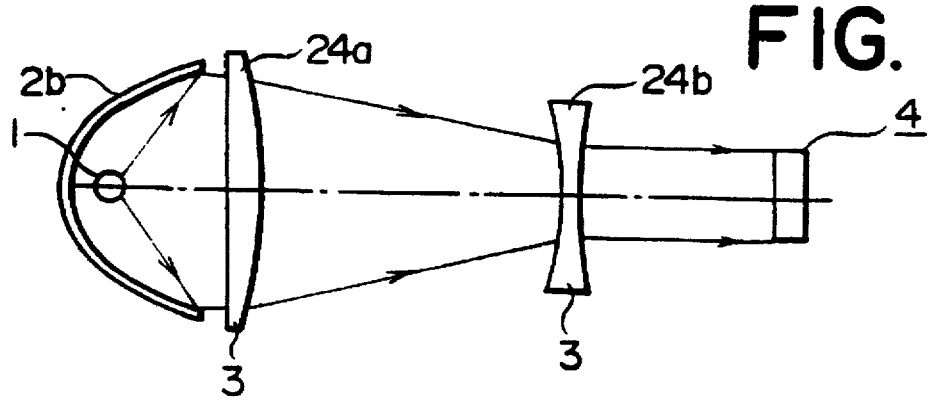

In FIGS. 14A to 14D, there are shown a concave mirror 2a of a elliptic shape in cross-section or of the so-called multimirror, and a concave mirror 2b of a parabolic shape in cross-section. In the illumination optical system of FIG. 14A, the light emitted from the light source 1 and reflected from the elliptic-shape concave mirror 2a and the light emitted from the light source at about the focal point (hereinafter, called the front-side elliptic focal point) near the center of the concave mirror 2a are focused at around the focal point (hereinafter, called the back-side elliptic focal point) of the elliptic-shape concave mirror 2a near the liquid crystal display element 4. Thus, the condenser lens group 3 as a concave lens having a predetermined positive power is provided near the back-side elliptic focal point on the light bulb side, so that the light ray exiting from the condenser lens is substantially parallel to the optical axis or slightly focused. Therefore, all the light from the light source can be made to be almost incident to the condenser lens at the back-side focal point. Also, the height of the light ray from the optical axis is small, and thus the aperture of the condenser lens group 3 is not large. In addition, the light utilization efficiency can be increased by a small number of lenses and hence without deterioration of aberration. In this construction, if the light source 1 is a point light source, the light emitted from the point light source provided at the front-side elliptic focal point and reflected from the elliptic-shape concave mirror 2a is all focused at the back-side focal point. Thus, the reflected light can all be controlled by the condenser lens group 3. As illustrated in FIG. 14B, since the elliptic-shape concave mirror 2a is used as in FIG. 14A and the condenser lens group 3 having a negative power is provided on the light-source side of the back-side elliptic focal point, the construction shown in FIG. 14B is able to achieve the same effect as that shown in FIG. 14A. In the illumination optical system shown in FIG. 14C, the light emitted from the light source 1 and reflected from the parabolic-shape concave mirror 2b and the light emitted from the light source at around the focal point (hereinafter, called the parabolic focal point) proceed in substantially parallel to the optical axis. Thus, as illustrated in FIG. 14C, all the light ray from the light source is almost incident to a condenser lens 23a having a positive power which is provided at just the light-exiting side of the parabolic-shape concave mirror, and thus all the light ray diffusively emitted from the light source is almost passed through the condenser lens 23a. The light ray passed through the condenser lens 23a is focused at around the focal point of the condenser lens 23a. A condenser lens 23b having a positive refractive power is also provided near the focal point of the condenser lens 23a on the light valve side. If the power and location of the condenser lens 23b are determined according to the focal point of the condenser lens 23 at which the light energy is the greatest, almost all the light from the light source can be irradiated on the light display. In this case, the aperture of the condenser lens 23b is also not necessary to be increased for the same reason as in FIGS. 14A and 14B. The construction shown in FIG. 14D is equivalent to the replacement of the condenser lens 23b in the construction of FIG. 14C by a condenser lens 24b having a negative power. In FIG. 14D, the light passed through the condenser lens 24a having the same action as the condenser lens 23a in FIG. 14C is focused at around the focal point. The condenser lens 24b is provided near the focal point of the condenser lens 24a on the light source side. Thus, all the light passed through the condenser lens 24b is almost incident to the light bulb. Therefore, if the power and locations of the these condenser lenses are selected to have proper values, the light from the light source can be controlled to be collected on the light valve a simple construction. Also, since the light diffusively emitted from the light source is once focused and, at near the focal point, the light is controlled, the incident light to the light valve can be controlled despite all the length of the illumination system. In addition, when the relatively intense light from the illumination system including the light source is incident to the liquid crystal display element or micro-lens array, it is not necessary to increase the incident angle of the light to the optical axis. Therefore, if the distance d between the flat-plate micro-lens array and the liquid crystal surface in the liquid crystal display element 4 is not shorter than in the prior art as described with reference to FIGS. 7A and 7B, a bright, compact and good-performance liquid crystal display can be constructed by use of these illumination optical system and liquid crystal display element.

Figure 15:
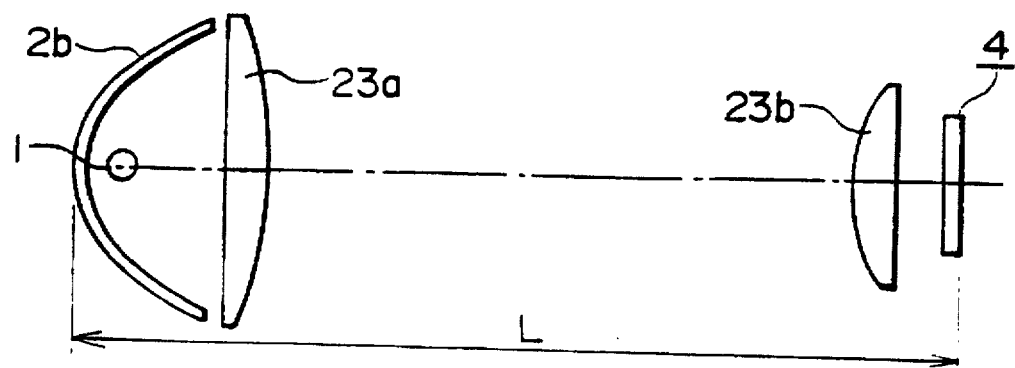
FIG. 15 is a diagram showing a modification of the construction of the illumination optical systems in FIGS. 14A to 14D.

FIG. 15 shows a modification of the illumination optical system shown in FIGS. 14A to 14D, concerning the first embodiment of the liquid crystal display element of the invention.

The illumination optical system in FIG. 15 is similar to the type shown in FIG. 14C of FIGS. 14A to 14D. Referring to FIG. 15, the illumination optical system includes the light source 1 for emitting light, and the concave mirror 2 and condenser lens group 3 having the action for irradiating the light from the light source on the liquid crystal display element 4 on which an optical image according to a video signal is formed. The concave mirror 2 is the parabolic-shape concave mirror 2b, and the condenser lens group 3 includes the condenser lens 23a having a positive refractive power provided near the light-exiting side of the parabolic-shape concave mirror 2b and the condenser lens 23b provided near the liquid crystal display element 4. Since the condenser lens 23a having a positive power is provided at the light-exiting side of the parabolic-shape concave mirror, all the light diffusively emitted from the light source is almost passed through the condenser lens 23a. The light passed through the condenser lens 23a is focused at around the focal point of the condenser lens 23a. The condenser lens 23b having a positive refractive power is provided on the light valve side of the focal point of the condenser lens 23a near the focal point. Since the power and location of the condenser lens 23b are determined in accordance with the most intensive light energy point at around the focal point of the condenser lens 23a, all the light from the light source can be irradiated on the light valve. Moreover, the light-source side of the condenser lens 23a and the light-bulb side of the condenser lens 23b are flat, or the flat convex lens, and thus can be easily produced and assembled. According to this construction, the aberration is not so deteriorated, and since a non-spherical surface is provided on the light-source side of the condenser lens 23b, the center thickness of the lens can be decreased, or the aberration to the light passed through the periphery of the lens can be decreased. In this embodiment, all the light incident to the flat-plate micro-lens array within the liquid crystal display element 4 can be passed through the liquid crystal display element 4 by properly setting the power of each condenser lens. Thus, the light utilization efficiency and the aperture ratio are high. In other words, a bright liquid crystal display can be obtained by use of this illumination optical system. According to this embodiment, since the flat-plate micro-lens array is integrally formed within one of transparent substrates of the liquid crystal cell as shown in FIG. 8, the total optical length (L shown in FIG. 15) is as small as 250 mm, and the light utilization efficient is 1.4 times as large as that in the case in which only a normal light source is used to irradiate the liquid crystal display element. Thus, the apparent aperture ratio is about twice the case in which the micro-lens array is absent.

Figure 16:
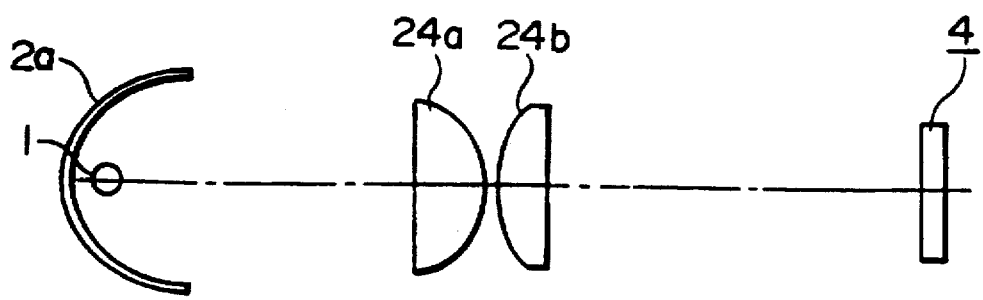
FIG. 16 is a diagram showing another construction of the one embodiment of the illumination optical systems in FIGS. 14A to 14D.

FIG. 16 shows a second modification of the illumination optical system shown in FIGS. 14A to 14D in the first embodiment of the display of the invention.

The illumination optical system in FIG. 16 is similar to that shown in FIG. 14A. In other words, the light emitted from the light source 1 and reflected from the elliptic-shape concave mirror 2a and the direct light emitted from the light source at around the front-side elliptical focal point of the concave mirror 2a are focused at around the back-side elliptic focal point. Thus, the condenser lenses 24a and 24b having a positive power as convex lenses are provided near the back-side elliptic focal point on the light-valve side. Since the power of the lenses is selected so that the light exiting from the condenser lenses is made substantially parallel to the optical axis or somewhat focused, all the light diffusively emitted from the light source can be conducted to be almost incident to the condenser lenses at the back-side focal point. Also, the height of the light from the optical axis is small, and the apertures of the condenser lenses 24a, 24b are not large. In addition, the light utilization efficiency can be increased with a small number of lenses used and hence with the aberration not deteriorated. Moreover, it is not necessary that the light be incident at a small angle to the flat-plate micro-lens array within the liquid crystal display element 4 as described above. Therefore, the light utilization efficiency and the aperture ratio are high. In other words, a bright liquid crystal display can be obtained by use of this illumination optical system.

Figure 17:
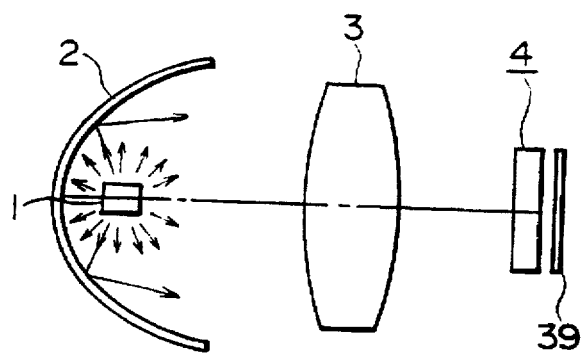
FIG. 17 is a diagram of a liquid crystal display of another embodiment of the invention using the liquid crystal display element concerning the above embodiments of the invention.

FIG. 17 is a cross-sectional view of a basic construction of the second embodiment of the liquid crystal display using the liquid crystal display element of the embodiments of the invention shown in FIGS. 1 to 12A, 12B as the light valve.

In FIG. 17, like elements corresponding to those in FIGS. 13A to 13D are identified by the same reference numerals and will not be described in detail. The drive circuit not shown is the same as that shown in FIGS. 13A, 13B. This embodiment is different from the above described ones in that the shape of the concave mirror 2, when projected on the cross-section perpendicular to the optical axis of the illumination optical system, is substantially similar to the shape of the aperture (picture element electrode) through which the light incident to the picture elements of the liquid crystal display element 4 shown in FIGS. 1 to 11 is transmitted. In addition, the shape of the light source 1, when projected on the cross-section perpendicular to the optical axis of the illumination optical system, is also similar to the shape of the aperture (picture element electrode) through which the light incident to the picture elements of the liquid crystal display element 4 shown in FIGS. 1 to 12A, 12B is transmitted. In this embodiment, since the liquid crystal display element 4 used as the light valve is single, for color display it is of course necessary to provide a color filter within the liquid crystal cell 5, though not shown. The action will be described with reference to FIG. 18.

Figure 18A:
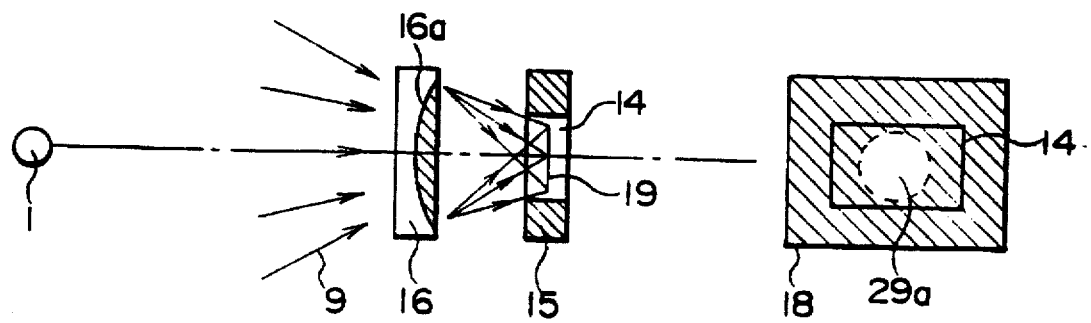
FIGS. 18A to 18B are diagrams useful for explaining the principle of the action of the illumination optical system of FIG. 17.
Figure 18B:
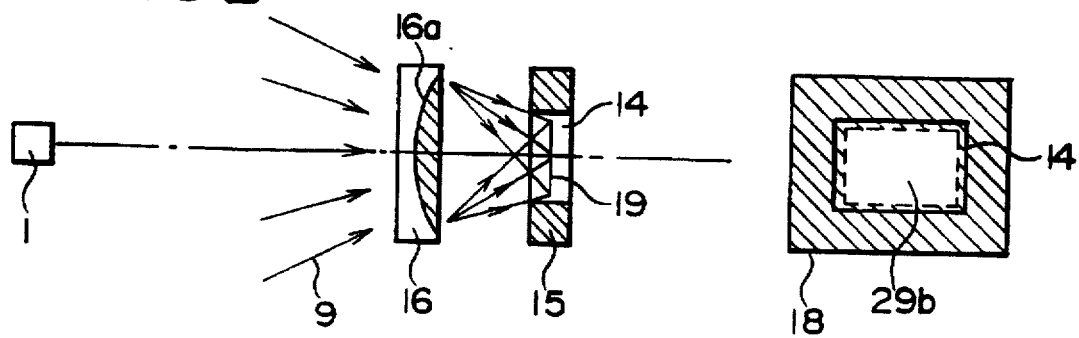

Light is incident at various angles to the micro-lens array if the size of the light source as viewed from the micro-lens array cannot be neglected as compared with the distance between the light source and the micro-lens array. (the light source as viewed from the micro-lens array indicates the image of the light source as viewed through the illumination optical system when the light from the light source is passed through the illumination optical system such as a concave mirror to the micro-lens array, and the distance between the light source and the micro-lens array indicates the distance of the image of the light source.) In that case, when conditions such as the focal distance of the micro-lens array are set so that the image of the light source can be formed at around the liquid crystal surface of the liquid crystal display element, the aperture ratio is better, and a brighter display can be achieved. In that case, however, the shape of the light source directly reflects the shape of the luminous flux passed through the aperture of the liquid crystal display element. Thus, as shown in FIG. 18A, when the shape of the light source as viewed from the micro-lens array 16 is circular, and when the shape of the aperture of one picture element 18 of the liquid crystal display element, or the shape of the picture element electrode 14 is rectangular, the shape of the luminous flux, 29a passed through the picture element electrode 14 is smaller than the shape of the picture element electrode 14, or only a narrower range than the picture element electrode 14 is bright and the other area is dark. In the whole liquid crystal display element, the range of the so-called black matrix becomes large, deteriorating the picture quality. Thus, as shown in FIG. 18B, if the shape of the light source 1 as viewed from the micro-lens array 16, or the shape thereof in the cross-section perpendicular to the optical axis is similar to the shape of the picture element electrode 14, the shape of the luminous flux, 29b near the image-forming point substantially coincides with the shape of the picture element electrode 14. Thus, the aperture ratio is high, or a bright and easy-to-see liquid crystal display can be obtained. FIGS. 19 and 20 show specific examples.

FIG. 19 are schematic diagrams of the light source associated with the second embodiment of the liquid crystal display of the invention.

Figure 19A:
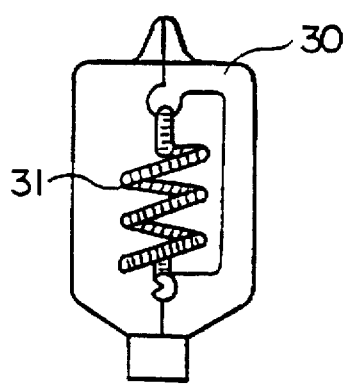
FIGS. 19A to 19D are cross-sectional diagrams showing the light source of FIG. 17.
Figure 19C:
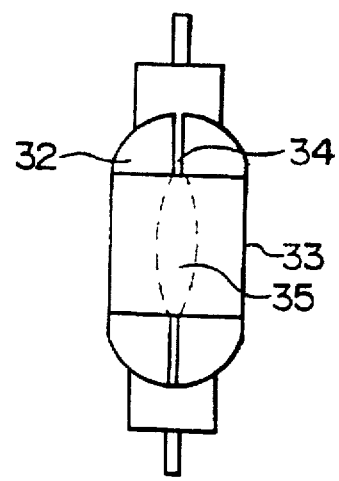
Figure 19B:
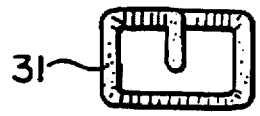
Figure 19D:
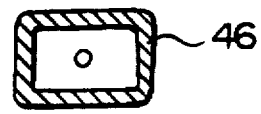
Figure 20A:
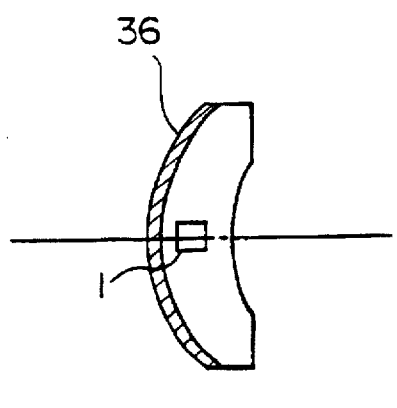
FIG. 20A and 20B is a perspective view of the concave mirror of FIG. 17.
Figure 20B:
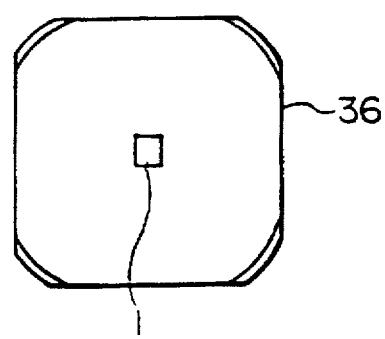

The light source 1 used in the above embodiment is an halogen lamp as for example shown in FIG. 19A. The halogen lamp, 30 is formed of a quartz thin tube in which is enclosed, for example, argon gas mixed with a small amount of nitrogen gas and with a very small amount of halogen gas such as iodine, bromin, chlorine or fluorine. The filament, 31 shown in FIGS. 19A, 19B is made of, for example, tungsten. This filament 31, as shown in FIG. 19B, is substantially rectangular in cross-section perpendicular to the optical axis. When the image of the light source is formed at around the aperture of the liquid crystal display element in order for the aperture ratio to be increased by the micro-lens array, the luminous flux is passed through the aperture as shown in FIG. 18B, and thus the picture on the liquid crystal display is easy to watch. FIG. 19C shows another example of the light source 1 in the above embodiment. The light source shown in FIG. 19C is a metal halide lamp 32. The metal halide lamp 32 is a lamp utilizing the arc discharge phenomenon in a high mercury vapor. As illustrated, it is formed of, for example, a quartz bulb 33 which has a pair of electrodes 34 provided therein and chiefly a rare gas such as argon, mercury and a metal halogenide as a luminescent material enclosed therein. When a discharge occurs between the electrodes, the mercury is evaporated by the generated heat so as to increase the pressure within the bulb to a high pressure of several atmospheric pressure to ten and several atmospheric pressure. Then, a high-temperature arc 35 is caused at the center within the bulb so that the metal halogenide is partially or all evaporated by the heat from the arc. At this time, light peculiar to the metal element is radiated from the arc. FIG. 19D is a cross-sectional view of the bulb 33. This bulb acts to diffusively emit light from its surface, and the cross-sectional shape of this bulb is substantially rectangular. Thus, it has the same effect as the light source shown in FIG. 19A. While two examples are given for the light source in this embodiment, the shape of the light source may be substantially similar to the shape of the picture element electrode 14 (aperture) of the liquid crystal display element. In other words, if the shape of the picture element electrode is circular, the shape of the light source may be substantially circular. In addition, the light source may be other luminescent bodies such as a xenon lamp other than the halogen lamp and the metal halide lamp.

FIG. 20 is a schematic perspective view of a concave mirror associated with the second embodiment of the liquid crystal display of the invention.

The concave mirror, 36 shown in FIG. 20 is, for example, elliptic or parabolic in the cross-section along the optical axis, but substantially rectangular like the shape of the picture element electrode 14 when viewed from the optical axis direction in which the light from the light source 1 proceeds. Thus, when the image of the light source 1 is formed at around the liquid crystal surface of the liquid crystal display element through the micro-lens array, the shape 29 of the luminous flux at around the image-formed point substantially coincides with the shape of the picture element electrode 14 as shown in FIG. 18B. Thus, since the luminous flux can be passed through the aperture, the picture on the liquid crystal display is easy to see. In this embodiment, since the light source 1 shown in FIGS. 19A to 19D has the shape substantially similar to that of the picture element electrode (aperture) shown in FIG. 18B, the light utilization efficiency can be improved.

Figure 21A:
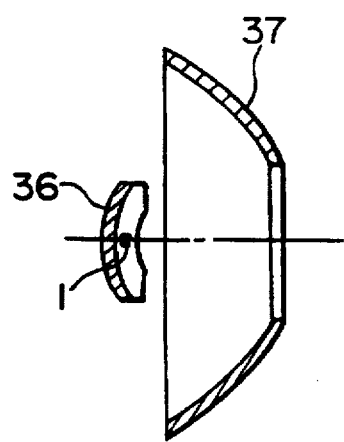
FIG. 21A and 21B is a cross-sectional diagram of a modification of the concave mirror of FIG. 20.
Figure 21B:
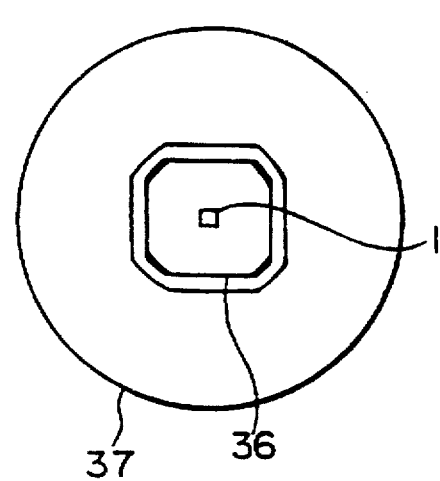

FIG. 21 is a schematic perspective view of a modification of the concave mirror associated with the second embodiment of the liquid crystal display of this invention.

As illustrated in FIG. 21, the concave mirror is formed of the substantially rectangular concave mirror 36 shown in FIG. 20 and a reflecting mirror 37. Part of the luminous flux from the light source 1, which is not reflected from the substantially rectangular concave mirror 36 but diffused to the external, is reflected from the reflecting mirror 37 back to the light source 1. Thus, the light utilization efficiency is improved as compared with that in FIG. 20, and hence a brighter liquid crystal display can be obtained. The reflecting mirror 37 is a spherical mirror, an elliptic surface mirror or a high-order non-spherical surface mirror. The shape and location of the mirror are set so that the light utilization efficiency is optimum.

According to the embodiments shown in FIGS. 17 to 21, the aperture ratio is increased twice as large as that with no micro-lens array, by the flat-plate micro-lens array provided on the liquid crystal display element 4. Also, since the light source or concave mirror has the shape similar to that of the aperture of the liquid crystal display element, the whole aperture of the liquid crystal display element allows light to pass therethrough, thus providing a bright and clear picture. If the condenser lens group 3 in the embodiment shown in FIG. 17 is constructed to be shown in FIGS. 14A, 14D to FIG. 16, the liquid crystal display can be constructed to be further compact and bright. While the embodiment shown in FIG. 17 is an example of the direct-viewing type liquid crystal display, this may be applied to the projection type liquid crystal display in which the picture is displayed through the projection lens onto the screen, as shown in FIGS. 13B and 13D.

Figure 22:
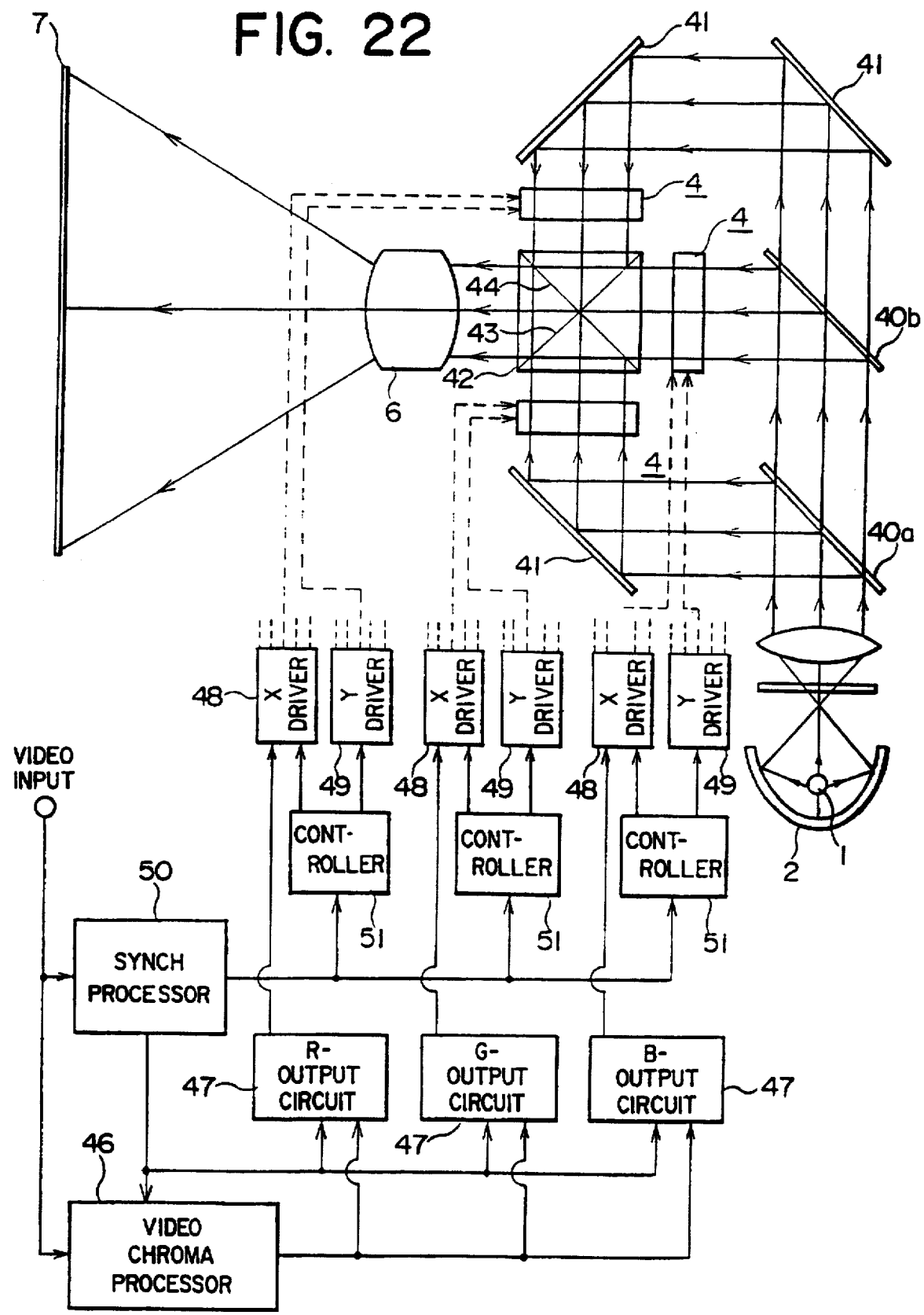
FIG. 22 is a diagram of a 3-plate projection-type liquid crystal display of still another embodiment of the invention using the liquid crystal display element associated with the above embodiments of the invention.

FIG. 22 shows the third embodiment of the liquid crystal display using the liquid crystal display element according to the embodiment of the invention as the light bulb.

In FIG. 22, three liquid crystal display elements according to this invention are used to correspond to three colors of R (red), G (green) and B (blue), or so-called three primaries of color and to constitute a three-plate projection type liquid crystal display. Referring to FIG. 22, the light emitted from the light source 1 of, for example, metal halide, xenon or halogen is, directly or after reflection from the concave mirror 2, passed through an infrared-cut filter 45 which reflects infrared light and allows visible light to be passed therethrough. Then, the visible light is incident to the condenser lens group 3 and thereby made substantially parallel to the optical axis. The parallel light exiting from the condenser lens group is fed to a B (blue)-reflecting dichroic mirror 40a which is tilted at 45° to the optical axis. Thus, the blue light B is reflected from the dichroic mirror, but the red light R and green light G are passed through the dichroic mirror.

The reflected blue light B is deflected by an all-reflecting mirror 41, and incident to the liquid crystal display element 4 (8, 16, 11, 13, 14, 15, 11, 8). On the other hand, the red light R and green light G passed through the B-reflecting dichroic mirror 40a are incident to a G-reflecting dichroic mirror 40b which is tilted at 45° to the optical axis. The green light G is reflected from the G-reflecting dichroic mirror 40b, but the red light R is passed through the G-reflecting dichroic mirror. The reflected green light G is directly incident to another liquid crystal display element 4. The red light R passed through the G-reflecting dichroic mirror 40b is deflected by another all-reflecting mirror 41 and incident to the other liquid crystal display element 4.

The pictures R, G, B displayed on the liquid crystal 13 surfaces of the respective liquid crystal display elements 4 are added by a dichroic prism 42 which has a B-reflecting surface 43 and an R-reflecting surface 44 tilted at an angle of 45° to the optical axis of the corresponding color light. The added picture is magnified and projected as a real image on the screen 7 by the projection lens 6.

The drive circuit for the liquid crystal display elements in this embodiment shown in FIG. 22 is, for example, shown in FIG. 22 at the lower area. A video signal from a laser disk, a VTR or the like is supplied to the video chroma processing circuit 46 and then to R-, G- and B-output circuits 47. The R-, G- and B-output circuits 47 invert the polarity of each color video signal at every vertical periods in order to AC-drive the liquid crystal display elements, and supply the polarity-inverted color video signals to the liquid crystal display elements 4 through X-drivers 48, respectively. The video chroma processing circuit 46, and the output circuits 47, X-drivers 48 and Y-drivers 49 for the respective colors are synchronized with each other by the synchronization processing circuit 50 and the controllers 51 for the respective colors.

According to the embodiment of FIG. 22, for example the light source 1 and concave mirror 2 are constructed as shown in FIG. 19A to 19D, 20 or 21, and the condenser lens group 3 is constructed as shown in FIG. 14A to 14D, 15 or 16. Also, the liquid crystal display elements 4 with the flat-plate micro-lens array are constructed as shown in FIG. 1, 8, 10 or 12A, 12B. Thus, the projection type display is bright, compact and of high performance. The action of the flat-plate micro-lens array and condenser lens group has already been described and thus will not be described in detail.

Moreover, in the above embodiments of the invention, when a large-power light source is used for the liquid crystal display shown in FIG. 13A to 13D, 17 or 22, the liquid crystal display itself may be adversely affected by the heat of focused light. In that case, a coolant is interposed between the condenser lens group and the liquid crystal display element, suppressing the heat generation due to light. Thus, the illumination optical system can be satisfactorily operated for the liquid crystal display.

Figure 23:
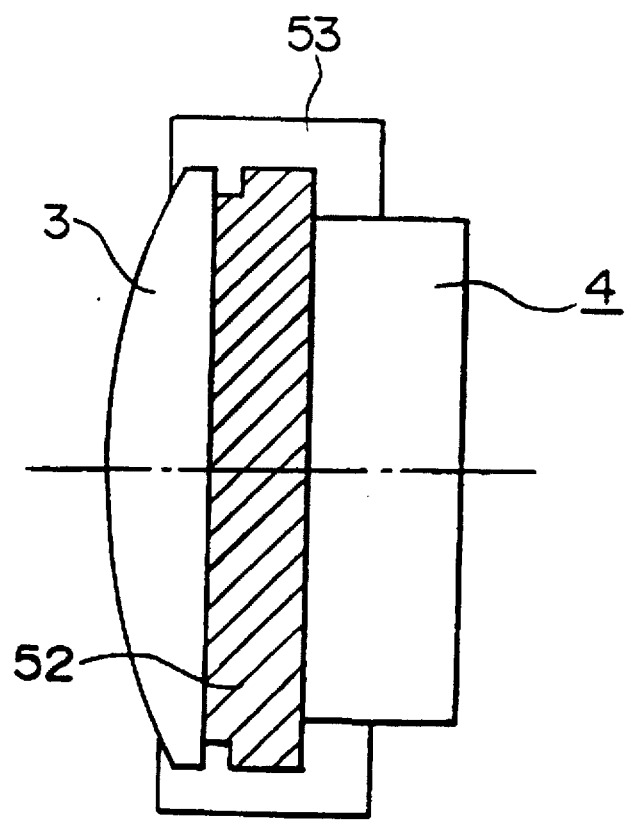
FIG. 23 is a cross-sectional diagram of a main part of a modification of the embodiments shown in FIGS. 13A, 13B, 17 and 22.

FIG. 23 is a cross-sectional view of a main part of the liquid crystal display of the invention. The liquid crystal display element 4 and the nearest lens of the condenser lens group 3 to the liquid crystal display element 4 are fixed by a lens-fixing member 53 with a space kept therebetween, and a coolant 52 is injected in the space between the liquid crystal display element 4 and the nearest lens of the condenser lens group 3 to the element 4. This coolant filled space is hermetically sealed. Moreover, although not shown, the coolant may be injected in the space between the concave mirror 2 and the surface of the nearest lens of the condenser lens group 3 to the concave mirror 2. In this case, similarly the heat generation due to light can be suppressed, and thus the illumination optical system can be satisfactorily operated for the liquid crystal display.

Thus, according to the invention, even if the aperture ratio is poor (or small) as one of the factors by which the light utilization efficiency is decreased as in the prior art, the liquid crystal display element is almost not affected by the poor aperture ratio, or has apparently a high aperture ratio, or can provide bright picture information, and the liquid crystal display using this liquid crystal display element is bright, easy to see and small-sized.

What is claimed:

1. A transmission-type liquid crystal display element for displaying picture information by an electrooptical effect of a liquid crystal injected between a pair of transparent substrates, wherein a light-incident side of one of said transparent substrates is closely attached at its front surface, with a flat-plate micro-lens array which has regions of unit lenses arranged in the same manner as the picture elements of said liquid crystal so that said regions respectively oppose the picture elements of the picture element array of said liquid crystal, each of said regions of unit lenses having a rectangular shape, and the focal point of each unit lens is coincident substantially with a surface of said liquid crystal and with a center of a corresponding picture element electrode.

2. A liquid crystal display element according to claim 1, wherein said flat-plate micro-lens array is proximate to the light-incident transparent substrate and to a light-exiting transparent substrate or said flat-plate micro-lens array is integrally formed within both said light-incident and light-exiting transparent substrates.

3. A liquid crystal display element according to claim 1, wherein said flat-plate micro-lens array is a two-dimensional refractive index distribution type flat-plate micro-lens array which has region of a refractive index N periodically formed within a substrate of a refractive index $N_0$ different from said N.

4. A liquid crystal display using the liquid crystal display element according to claim 1 as a light valve, comprising at least said liquid crystal display element and an illumination optical system.

5. A liquid crystal display according to claim 4, wherein said illumination optical system is formed of a concave mirror and a condenser lens group which act to irradiate light from a light source to said liquid crystal display element, said concave mirror has an elliptic shape, said light source is provided at approximately a focal point of said elliptical concave mirror on a side near its center, and said condenser lens group or part thereof is provided at around the focal point of said elliptical concave mirror on the side of said liquid crystal display element, said condenser lens group has a positive refractive index and said condenser lens group or part thereof is provided at an output side of said concave mirror at which the light from said light source exits.

6. A liquid crystal display according to claim 5, wherein a non-spherical surface is provided on at least one surface of said condenser lens group.

7. A liquid crystal display according to claim 4, wherein said illumination optical system has a concave mirror which acts to direct the luminous flux from a light source toward said liquid crystal display element and is arranged so that a shape of said concave mirror to a cross-section perpendicular to the optical axis of said illumination optical system is substantially similar to that of the aperture of said liquid crystal display element.

8. A liquid crystal display according to claim 4, wherein said illumination optical system has a reflecting mirror which acts to allow the luminous flux once emitted from said light source but not incident to said liquid crystal display element or said concave mirror to be incident to said light source, said liquid crystal display element or said concave mirror.

9. A liquid crystal display according to claim 4, wherein a coolant such as a liquid is filled in at least one of a space between said concave mirror and a surface of said condenser lens group on a side nearest to said concave mirror and a space between a surface of said liquid crystal display element on a side nearest to said light source and the surface of said condenser lens group on the side nearest to said liquid crystal display element.

10. A liquid crystal display according to claim 4, wherein said illumination optical system is formed of a concave mirror and a condenser lens group which act to irradiate light from a light source to said liquid crystal display, said concave mirror has a parabolic shape, said light source is provided at around a focal point of said parabolic concave mirror.

11. A liquid crystal display according to claim 4, wherein said illumination optical system has a mirror arrangement which acts to direct luminous flux from a light source toward said liquid crystal display element, and said mirror and flat-plate micro-lens arrangement having constructions such that a delivered luminous flux, as delivered to and viewed from each said picture element through said flat-plate micro-lens array, has a shape substantially similar to a shape of said picture element.

12. A liquid crystal display using the liquid crystal display element according to claim 1 as a light valve, comprising at least said liquid crystal display element, an illumination optical system and a projection optical system.

13. A liquid crystal display according to claim 12, wherein a plurality of said liquid crystal display element are used, and a optical system for separating light from a light source into colors and an optical system for adding different color pictures from said liquid crystal display elements are additionally provided.

14. A transmission-type liquid crystal display element for displaying picture information by an electrooptical effect of a liquid crystal injected between a pair of transparent substrates, wherein a light-incident side of one of said transparent substrates has integrally formed therein a flat plate micro-lens array which has regions of unit lenses arranged in the same manner as the picture elements of said liquid crystal so that said regions, respectively oppose the picture elements of the picture element array of said liquid crystal each of said regions of unit lenses having a rectangular shape, and the focal point of each unit lens is coincident substantially with a surface of said liquid crystal and with a center of a corresponding picture element electrode.

15. A transmission-type liquid crystal display element for displaying picture information by an electrooptical effect of a liquid crystal injected between a pair of transparent substrates, wherein a light-incident transparent substrate is proximate, at its front surface, with a flat-plate micro-lens array which has regions of unit lenses, each of said regions of unit lenses having a rectangular shape and respectively opposing one of the picture elements of the picture element array of said liquid crystal, and which, if one side and the other side of a flat shape of one of said picture elements are represented by $L_1$ and $L_2$, respectively, satisfies the following conditions, when $L_1 < L_2$, $\pi(L_1/2)^2 < S \leq L_1 \cdot L_2$,
when $L_1 = L_2$, $\pi(L_1/2)^2 < S \leq L_1^2$, where S is the area of the region acting as said unit lens, the focal point of each unit lens is coincident substantially with said liquid crystal, and if the angle of incident light to the surface of said liquid crystal is $\alpha$ and the distance from a back-side principal point of said unit lens to the surface of said liquid crystal is d, the optical axis of each of said unit lenses and a center of a corresponding picture element are displaced by a predetermined amount, y, expressed by the following equation, in accordance with the incident angle of said incident light, $$y = (d/n)\tan\alpha$$

where n is the refractive index of the medium from said micro-lens array to the surface of said liquid crystal.

16. A transmission-type liquid crystal display element for displaying picture information by the electrooptical effect of a liquid crystal injected between a pair of transparent substrates, wherein a light-incident transparent substrate is integral with a flat-plate micro-lens array which has regions of unit lenses, each of said regions of unit lenses having a rectangular shape and respectively opposing one of the picture elements of the picture element array of said liquid crystal, and which, if one side and the other side of a flat shape of one of said picture elements are represented by $L_1$ and $L_2$, respectively, satisfies the following conditions, when $L_1 < L_2$, $\pi(L_1/2)^2 < S \leq L_1 \cdot L_2$,
when $L_1 = L_2$, $\pi(L_1/2)^2 < S \leq L_1^2$, where S is the area of the region acting as said unit lens, and the focal point of each unit lens is coincident substantially with the surface of said liquid crystal, and if the angle of incident light to the surface of said liquid crystal is $\alpha$ and the distance from the back-side principal point of said unit lens to the surface of said liquid crystal is d, the optical axis of each of said unit lenses and a center of a corresponding picture element are displaced by a predetermined amount, y, expressed by the following equation, in accordance with the incident angle of said incident light, $$y = (d/n)\tan\alpha$$

where n is the refractive index of the medium from said micro-lens array to the surface of said liquid crystal.

17. A liquid crystal display element in which liquid crystal is injected into a pair of transparent substrates having picture elements defined therein for displaying picture information by utilizing a electrooptic effect of liquid crystal, comprising:

a flat-plate microlens array disposed in one of a close contact with and integrated with a transparent substrate at a beam incident side of said liquid crystal display element, a focal point of each unit lens of said flat-plate microlens array being coincident substantially with said liquid crystal and having a rectangular shape, wherein, if an angle of an incident light in one of said picture elements relative to an optical axis of said unit lens is θ, and a distance from a back-side principal point of said unit lens to said liquid crystal surface is d, the following relation is satisfied, $$D \geq 2(d/n)\tan\theta$$

where D is a diagonal length of a picture element electrode within the region corresponding to one picture element, and n is a refractive index of the medium from said micro-lens array to said liquid crystal surface.

18. A liquid crystal display comprising:

a transmission-type liquid crystal display element for displaying picture information by an electrooptical effect of a liquid crystal injected between a pair of transparent substrates, wherein a light-incident transparent substrate is proximate, at its front surface, with a flat-plate micro-lens array which has regions of unit lenses, said regions corresponding in shape to a shape of picture elements of said liquid crystal so that said regions respectively oppose the picture elements of the picture element array of said liquid crystal, and which, if one side and the other side of a flat shape of one of said picture elements are represented by $L_1$ and $L_2$, respectively, satisfies the following conditions, when $L_1 < L_2$, $\pi(L_1/2)^2 < S \leq L_1 L_2$,
when $L_1 = L_2$, $\pi(L_1/2)^2 < S \leq L_1^2$, where S is the area of the region acting as said unit lens, and the focal point of each unit lens is coincident substantially with said liquid crystal and center of a corresponding picture element, an illumination optical system; and a light source having a light emitting element of a shape substantially similar to a shape of an aperture of said picture element of the liquid crystal display element in a cross-section perpendicular to the optical axis of said illumination optical system.

19. A liquid crystal display as claimed in claim 18, wherein said regions of said unit lenses each have a rectangular shape.

20. A liquid crystal display comprising:

a transmission-type liquid crystal display element for displaying picture information by an electrooptical effect of a liquid crystal injected between a pair of transparent substrates, wherein a light-incident transparent substrate is proximate, at its front surface, with a flat-plate microlens array which has regions of unit lenses so that said regions respectively oppose the picture elements of the picture element array of said liquid crystal;

an illumination optical system; and a light source having a light emitting element of a shape substantially similar to a shape of an aperture of said picture element of the liquid crystal display element in a cross-section perpendicular to the optical axis of said illumination optical system.

21. A liquid crystal display as claimed in claim 20, wherein said regions of said unit lenses each have a rectangular shape.

22. A liquid crystal display comprising:

a transmission-type liquid crystal display element for displaying picture information by an electrooptical effect of a liquid crystal injected between a pair of transparent substrates, wherein a light-incident transparent substrate is proximate, at its front surface, with a flat-plate microlens array which has regions of unit lenses, said regions corresponding in shape to a shape of picture elements of said liquid crystal so that said regions respectively oppose the picture elements of the picture element array of said liquid crystal;

an illumination optical system; and a light source having a light emitting element of a shape substantially similar to a shape of an aperture of said picture element of the liquid crystal display element in a cross-section perpendicular to the optical axis of said illumination optical system.

23. A liquid crystal display as claimed in claim 22, wherein said regions of said unit lenses each have a rectangular shape.

24. A liquid crystal display element in which liquid crystal is injected into a pair of transparent substrates having picture elements defined therein for displaying picture information by utilizing a electrooptic effect of liquid crystal, comprising:

a flat-plate microlens array disposed in one of a close contact with and integrated with a transparent substrate at a beam incident side of said liquid crystal display element, a focal point of each unit lens of said flat-plate microlens array being coincident substantially with said liquid crystal and each unit lens having a rectangular shape, wherein said flat-plate micro-lens array and said liquid crystal display element are provided tilted at an angle with respect to an angle of incident light, and wherein, if an angle of an incident light in one of said picture elements relative to an optical axis of said unit lens is θ, and a distance from a back-side principle point of said unit lens to said liquid crystal surface is d, the following relation is satisfied, $$D \geq 2(d/n)\tan\theta$$

where D is a diagonal length of a picture element electrode within the region corresponding to one picture element, and n is a refractive index of the medium from said microlens array to said liquid crystal surface.

25. A liquid crystal display element in which liquid crystal is injected into a pair of transparent substrates having picture elements defined therein for displaying picture information by utilizing a electrooptic effect of liquid crystal, comprising:

a flat-plate micro-lens array disposed in one of a close contact with and integrated with a transparent substrate at a beam incident side of said liquid crystal display element, a focal point of each unit lens of said flat-plate micro-lens array being coincident substantially with said liquid crystal and each unit lens having a rectangular shape, wherein said flat-plate micro-lens array and said liquid crystal display element are provided tilted at an angle with respect to a main axis of incident light such that said main axis of incident light substantially does not parallel a perpendicular axis extending from a main plane of said liquid crystal display element, and wherein, if an angle of an incident light in one of said picture elements relative to an optical axis of said unit lens is $\theta$, and a distance from a back-side principle point of said unit lens to said liquid crystal surface is d, the following relation is satisfied, $$D \geq 2(d/n)\tan\theta$$

where D is a diagonal length of a picture element electrode within the region corresponding to one picture element, and n is a refractive index of the medium from said micro-lens array to said liquid crystal surface.

26. A transmission-type liquid crystal display element for displaying picture information by an electrooptical effect of a liquid crystal injected between a pair of transparent substrates, wherein a light-incident transparent substrate is proximate, at its front surface, with a flat-plate micro-lens array which has regions of unit lenses, each of said regions of unit lenses having a rectangular shape and respectively opposing one of the picture elements of the picture element array of said liquid crystal, and which, if one side and the other side of a flat shape of one of said picture elements are represented by $L_1$ and $L_2$, respectively, satisfies the following conditions, when $L_1 < L_2$, $\pi(L_1/2)^2 < S \leq L_1 L_2$,
when $L_1 = L_2$, $\pi(L_1/2)^2 < S \leq L_1^2$, where S is the area of the region acting as said unit lens, the focal point of each unit lens is coincident substantially with said liquid crystal, and wherein said flat-plate micro-lens array and said liquid crystal display element are provided tilted at an angle with respect to a main axis of incident light such that said main axis of incident light substantially does not parallel a perpendicular axis extending from a main plane of said liquid crystal display element, and if the angle of incident light to the surface of said liquid crystal is $\alpha$ and the distance from a back-side principle point of said unit lens to the surface of said liquid crystal is d, the optical axis of each of said unit lenses and a center of a corresponding picture element are displaced by a predetermined amount, Y, expressed by the following equation, in accordance with the incident angle of said incident light, $$Y=(d/n)\tan\alpha$$

where n is the refractive index of the medium from said micro-lens array to the surface of said liquid crystal.

27. A liquid crystal display as claimed in claim 26, wherein said regions of said unit lenses each have a rectangular shape.

28. A transmission-type liquid crystal display element for displaying picture information by the electrooptical effect of a liquid crystal injected between a pair of transparent substrates, wherein a light incident transparent substrate is integral with a flat-plate micro-lens array which has regions of unit lenses, said regions corresponding in shape to a shape of picture elements of said liquid crystal so that said regions respectively oppose the picture elements of the picture element array of said liquid crystal, and which, if one side and the other side of a flat shape of one of said picture elements are represented by $L_1$ and $L_2$, respectively, satisfies the following conditions, when $L_1 < L_2$, $\pi(L_1/2)^2 < S \leq L_1 L_2$,
when $L_1 = L_2$, $\pi(L_1/2)^2 < S \leq L_1^2$, where S is the area of the region acting as said unit lens, and the focal point of each unit lens is coincident substantially with the surface of said liquid crystal, and wherein said flat-plate micro-lens array and said liquid crystal display element are provided tilted at an angle with respect to a main axis of incident light such that said main axis of incident light substantially does not parallel a perpendicular axis extending from a main plane of said liquid crystal display element, and if the angle of incident light to the surface of said liquid crystal is $\alpha$ and the distance from the back-side principle point of said unit lens to the surface of said liquid crystal is d, the optical axis of each of said unit lenses and a center of a corresponding picture element are displaced by a predetermined amount, Y, expressed by the following equation, in accordance with the incident angle of said incident light, $$Y=(d/n)\tan\alpha$$

where n is the refractive index of the medium from said micro-lens array to the surface of said liquid crystal.

29. A liquid crystal display as claimed in claim 28, wherein said regions of said unit lenses each have a rectangular shape.

* * * * *